(12) United States Patent
Takaishi et al.

(10) Patent No.: US 8,520,247 B1
(45) Date of Patent: Aug. 27, 2013

(54) IMAGE FORMING APPARATUS, CHARGE SERVER AND IMAGE FORMING SYSTEM

(71) Applicants: Hiroyuki Takaishi, Osaka (JP); Toru Yasui, Osaka (JP)

(72) Inventors: Hiroyuki Takaishi, Osaka (JP); Toru Yasui, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/713,832

(22) Filed: Dec. 13, 2012

Related U.S. Application Data

(63) Continuation of application No. 12/351,280, filed on Jan. 9, 2009, now abandoned.

(30) Foreign Application Priority Data

Jan. 11, 2008 (JP) .................................. 2008-003936
Jan. 11, 2008 (JP) .................................. 2008-003937
Jan. 11, 2008 (JP) .................................. 2008-003938
Jan. 11, 2008 (JP) .................................. 2008-003939

(51) Int. Cl.
*G06F 3/12* (2006.01)

(52) U.S. Cl.
USPC ........................................ 358/1.15; 358/1.18

(58) Field of Classification Search
None
See application file for complete search history.

(56) References Cited

FOREIGN PATENT DOCUMENTS

JP 2003-345558 12/2003
JP 2005-141311 6/2005

*Primary Examiner* — Twyler Haskins
*Assistant Examiner* — Lennin Rodriguezgonzalez
(74) *Attorney, Agent, or Firm* — Stephen Chin

(57) ABSTRACT

An image forming apparatus has a communication interface, a processor, and a storage unit. The storage unit stores a job log and a job log transmission program. The job log transmission program causes the processor to transmit a job log of a finished job via the communication interface to a charge server connected to a network. The job log transmission program causes the processor to execute the steps of:
(a) via the communication interface, determining whether or not the charge server can receive the job log currently, and
(b) if it is determined that the charge server can not receive the job log currently, keeping the job log to be transmitted in the storage unit and transmitting the job log kept in the storage unit to the charge server when a job log of a next job is transmitted to the charge server.

6 Claims, 21 Drawing Sheets

FIG.2

| USER ID | PASS-WORD | | LIMIT NUMBER OF PAGES | | | | | TOTAL NUMBER OF PAGES | | | | | | | | | |
|---|---|---|---|---|---|---|---|---|---|---|---|---|---|---|---|---|---|
| | | | PRINTING | | | SCAN-NING | FACSIMILE TRANS-MITTING | PRINTING | | | | | | SCAN-NING | | FACSIMILE TRANS-MITTING | |
| | | | ALL | MONO-CHROME | COLOR | | | ALL | | MONO-CHROME | | COLOR | | | | | |
| 001 | ******** | ---- | 1100 | 1000 | 200 | 300 | 200 | 0 | 530 | 0 | 487 | 0 | 43 | 0 | 132 | 0 | 86 |
| ---- | ---- | ---- | ---- | ---- | ---- | ---- | ---- | ---- | ---- | ---- | ---- | ---- | ---- | ---- | ---- | ---- | ---- |
| 027 | ******** | ---- | 2800 | 2500 | 500 | 600 | 400 | 0 | 1391 | 0 | 1329 | 0 | 62 | 0 | 286 | 0 | 126 |
| ---- | ---- | ---- | ---- | ---- | ---- | ---- | ---- | ---- | ---- | ---- | ---- | ---- | ---- | ---- | ---- | ---- | ---- |

34

JOB RESTRICTION FLAG

FIG.3A

| NO | USER ID | PASSWORD | USER NAME | SECTION ID | USER ACCOUNT |
|---|---|---|---|---|---|
| 1 | 0001 | ******** | Admin | — | ADMINISTRATOR |
| 2 | 0106 | ******** | User | 027 | NORMAL USER |

| NO | SECTION ID | SECTION NAME | LIMIT NUMBER OF PAGES | | | | | TOTAL NUMBER OF PAGES | | | | | JOB RESTRICTION FLAG | | | | |
|---|---|---|---|---|---|---|---|---|---|---|---|---|---|---|---|---|---|
| | | | PRINTING | | | SCAN-NING | FACSIMILE TRANS-MITTING | PRINTING | | | SCAN-NING | FACSIMILE TRANS-MITTING | PRINTING | | | SCAN-NING | FACSIMILE TRANS-MITTING |
| | | | ALL | MONO-CHROME | COLOR | | | ALL | MONO-CHROME | COLOR | | | ALL | MONO-CHROME | COLOR | | |
| 1 | 027 | 3RD-DESIGN | 2800 | 2500 | 500 | 600 | 400 | 1391 | 1329 | 62 | 286 | 126 | 0 | 0 | 0 | 0 | 0 |

| `<JobID>C200710120001</JobID>` |
| `<SessonID>1023</SessonID>` |
| `<UserID>KM0231</UserID>` |
| `<BillingID>A301254813</BillingID>` |
| `<BillingValue></BillingValue>` |
| `<JobType>Print</JobType>` |
| `<StartTime>2007.10.31:10.53.24</StartTime>` |
| `<EndTime>2007.10.31:10.55.03</EndTime>` |
| `<PageInfo>` |
|    `<ColorFlag>true</ColorFlag>` |
|    `<DuplexFlag>false</DuplexFlag>` |
|    `<PageSixe>A4</PageSixe>` |
|    `<MediaType>normal</MediaType>` |
| `</PageInfo>` |
| |
| `<PageInfo>` |
|    `<ColorFlag>false</ColorFlag>` |
|    `<DuplexFlag>true</DuplexFlag>` |
|    `<PageSixe>A3</PageSixe>` |
|    `<MediaType>normal</MediaType>` |
| `</PageInfo>` |
| 0 |

FIG.11

```
320A
<JobID>C200710120001</JobID>
<SessionID>1023</SessionID>
<UserID>KM0231</UserID>
<BillingID>A301254813</BillingID>
<BillingValue></BillingValue>
<JobType>Print</JobType>
<StartTime>2007.10.31:10.53.24<StartTime>
<EndTime>2007.10.31:10.55.03</EndTime>
<PageInfo>
    <PageCount>1</PageCount>
    <ColorFlag>true</ColorFlag>
    <DuplexFlag>false</DuplexFlag>
    <PageSixe>A4</PageSixe>
    <MediaType>normal</MediaType>
</PageInfo>
        ⋮
<PageInfo>
    <PageCount>1</PageCount>
    <ColorFlag>false</ColorFlag>
    <DuplexFlag>true</DuplexFlag>
    <PageSixe>A3</PageSixe>
    <MediaType>normal</MediaType>
</PageInfo>
                0
```

Bracket labels: 51 (first PageInfo block), 5p (last PageInfo block)

FIG.13

| |
|---|
| <JobID>C200710120001</JobID> |
| <SessonID>1023</SessonID> |
| <UserID>KM0231</UserID> |
| <BillingID>A301254813</BillingID> |
| <BillingValue>460</BillingValue> |
| <JobType>Print</JobType> |
| <StartTime>2007.10.31:10.53.24<StartTime> |
| <EndTime>2007.10.31:10.55.03</EndTime> |
| <PageInfo> |
|    <PageCount>2</PageCount> |
|    <ColorFlag>true</ColorFlag> |
|    <DuplexFlag>false</DuplexFlag> |
|    <PageSixe>A4</PageSixe> |
|    <MediaType>photo</MediaType> |
| </PageInfo> |
| <PageInfo> |
|    <PageCount>3</PageCount> |
|    <ColorFlag>false</ColorFlag> |
|    <DuplexFlag>true</DuplexFlag> |
|    <PageSixe>A4</PageSixe> |
|    <MediaType>normal</MediaType> |
| </PageInfo> |
| <PageInfo> |
|    <PageCount>1</PageCount> |
|    <ColorFlag>true</ColorFlag> |
|    <DuplexFlag>false</DuplexFlag> |
|    <PageSixe>A3</PageSixe> |
|    <MediaType>photo</MediaType> |
| </PageInfo> |
| 0 |

320B

IMAGE FORMING APPARATUS, CHARGE SERVER AND IMAGE FORMING SYSTEM

CROSS-REFERENCE TO RELATED APPLICATIONS

This application is a continuation application of U.S. application Ser. No. 12/351,280 filed on Jan. 9, 2009. This application and the parent application also relate to and claims priority rights from Japanese Patent Applications:
No. 2008-003936, filed on Jan. 11, 2008,
No. 2008-003937, filed on Jan. 11, 2008,
No. 2008-003938, filed on Jan. 11, 2008, and
No. 2008-003939, filed on Jan. 11, 2008,
the entire disclosures of which are hereby incorporated by reference herein.

BACKGROUND OF THE INVENTION

1. Field of the Invention

This invention relates to image forming apparatus, charge server, and image forming system.

2. Description of the Related Art

In an environment, a user can choose one from image forming apparatuses, and uses it for copying, printing or transmitting facsimile data. In the environment, to perform charge management for each of users or each of sections, a charge server is connected to a network with the image forming apparatuses, and every time when a job ends in one of the image forming apparatuses, a job log is transmitted from the image forming apparatus to the charge server. The job log contains information necessary to charge management.

In general, the image forming apparatus organizes charge information on many pages, and inserts it to the job log.

In a specific example, upon a request from an image forming apparatus, a functional server obtains, for example, news data from a database, and transmits it to the image forming apparatus. The image forming apparatus executes printing of the news data. In this system, it is possible to charge adequately for only pages chosen by a user before printing. The functional server generates print data files of respective pages, and transmits the respective files with respective charge information (that contains a charge amount) to the image forming apparatus in turn. The image forming apparatus displays a total charge amount for the pages chosen by the user, and transmits the total charge amount information to the functional server upon a printing start instruction by the user.

In the aforementioned environment, to perform authentication, authorisation, charge management, usage limitation and so on for each of users, a management server is connected to a network with the image forming apparatuses, and unitarily manages authentication, authorisation, charge management, usage limitation, and so on.

However, a user can not use the image forming apparatus when the management server can not execute authentication and authorisation due to server down, disconnection in a wired/wireless network, or the like. To solve this problem, an image forming apparatus performs user authentication locally with authentication information stored in a removable medium capable of connecting to the server.

An image forming apparatus has a section management function for limiting the number of pages printed in a predetermined period by each of sections. In the section management function, a user table has a user ID and a section ID that are related to each other, a section management table has the section ID, a limit number of printed pages and the total number of printed pages that are related to each other. With referring to the tables, it is determined whether or not the total number exceeds the limit number when every page is finished printing, and a user is forbidden to use this apparatus if it is determined that the total number exceeds the limit number.

In an image forming system, many image forming apparatuses like the aforementioned image forming apparatus are connected to a LAN, and a user can use whichever of the apparatuses. This system can not perform the section management at one place. In addition, due to increment of users, the user table can not be stored in a memory in an image forming apparatus if the memory is not large enough. To solve this problem, in the system, a management server is connected to the LAN, stores the user table in a storage device of the server, and performs authentication and charge management with the user table.

SUMMARY OF THE INVENTION

In a circumstance, if the charge server can not receive a job log from the image forming apparatus due to server down, disconnection in a wired/wireless network, or the like, the image forming apparatus transmits the job log to the charge server repeatedly. In this case, the image forming apparatus can not handle a next process.

Accordingly, an objective of this invention is to provide an image forming apparatus and an image forming system in which even if the charge server can not receive a job log from the image forming apparatus temporarily, the image forming apparatus can handle a next process, and the charge server can perform charge management.

In another circumstance, due to increment of users, user authentication information, usage limit information, total usage information and so on can not be stored in a memory in the image forming apparatus. In addition, in case that one user can use whichever of the image forming apparatuses, usage limitation can not be done adequately.

Accordingly, another objective of this invention is to provide an image forming apparatus and an image forming system in which even if the management server can not perform user authentication temporarily due to any reasons, a user can use the image forming apparatus, and unauthorised use can be prevented or controlled.

In the aforementioned specific example, when all pages of a job are printed, the job is substantially divided into one-page jobs. Therefore, processing the job is complicated and it is not practical. Some jobs contain both color printing and monochrome printing, or both duplex printing and simplex printing, or different sheet sizes and types. Therefore, the image forming apparatus classifies pages into groups of pages charged equally, and organizes charge information on each of the groups, and consequently, process may be delayed due to lower processing speed and a smaller size of a memory of the image forming apparatus than those of a client computer. To solve this problem, it may increase a cost to configure the system.

Accordingly, another objective of this invention is to provide an image forming apparatus, a charge server and an image forming system thereof, in which even if the structure of charge information on one job is complicated, the system can prevent process delay. It can prevent a cost to configure the system from increasing.

In another circumstance that the system performs user management rather than section management, the image forming apparatus is required to be available without a connection to the network. Therefore, the image forming apparatus has to have a computer program capable of performing both the user management and the section management, and consequently, software configuration of the image forming apparatus becomes complicated.

Accordingly, another objective of this invention is to provide an image forming apparatus and an image forming system thereof, in which existent programs can be used effectively to limit usage with referring to usage limit information in the image forming apparatus connected to a network.

In the first aspect of this invention, an image forming apparatus has a processor; a storage unit that stores a job log transmission program and a job log; and a communication interface. The job log transmission program causes the processor to transmit a job log of a finished job via the communication interface to a charge server connected to a network. Further, the job log transmission program causes the processor to execute the steps of:

(a) via the communication interface, determining whether or not the charge server can receive the job log currently, and (b) if it is determined that the charge server can not receive currently, keeping the job log to be transmitted in the storage unit and transmitting the job log to the charge server when a job log of a next job is transmitted to the charge server.

In the second aspect of this invention, in addition to the first aspect, the job log transmission program causes the processor to serially link the job log kept in the storage unit and a job log of a finished job, and to transmit all the linked job logs to the charge server.

According to the first aspect, even if the charge server can not receive a job log due to server down, disconnection in a wired/wireless network or the like, the image forming apparatus can handle a next process, and the charge server can perform charge management.

According to the second aspect, regardless of whether or not the charge server can receive a job log from the image forming apparatus, the image forming apparatus attaches a job log of a finished job to the kept job log in the same manner.

In the third aspect of this invention, an image forming apparatus has a processor; a storage unit that stores a program and data; an input device; and a communication interface connected to a management server on a network. The program causes the processor to execute the steps of:

(a) via the communication interface, transmitting authentication information input with the input device to the management server to request authentication, (b) if an authentication result of the request is not received, causing the storage unit to store the unprocessed authentication information, and receiving a job under an assumption of successful authentication, and (c) at a predetermined timing, transmitting the unprocessed authentication information stored in the storage unit to the management server.

In the fourth aspect of this invention, in addition to the third aspect, the image forming apparatus has a timer that outputs a current time and date. The program causes the processor to execute:

in the step (a), detecting a login attempting time and date with output of the timer, and transmitting the login attempting time and date with the authentication information to the management server;

in the step (b), causing the storage unit to store the login attempting time and date with the unprocessed authentication information; and in the step (c), transmitting the login attempting time and date with the unprocessed authentication information to the management server.

In the fifth aspect of this invention, in addition to the third or fourth aspect, the program causes the processor to execute the steps of:

(d) transmitting a job log of a job via the communication interface to the management server when the job ends, and (e) causing the storage unit to store this job log if an acknowledgement that indicates the management server receives the job log is not received from the management server.

In the step (c), the program causes the processor to transmit the job log stored in the step (e) to the management server together with the authentication information kept in the storage unit.

In the sixth aspect of this invention, in addition to the fifth aspect, the program causes the processor to execute:

in the step (b), assigning a temporal session ID and a temporal job ID and causing the storage unit to store the temporal session ID and the temporal job ID with the authentication information kept in the storage unit;

in the step (c), transmitting the temporal session ID and the temporal job ID to the management server together with the authentication information; and in the step (d), inserting the temporal session ID and the temporal job ID in a job log corresponding thereto.

In the seventh aspect of this invention, in addition to any of the third to sixth aspects, the program causes the processor to execute the step of: (f) when an authentication result of the authentication information transmitted in the step (c) is received from the management server, determining whether or not a job corresponding to the authentication information has ended, and stopping the job if it is determined that the job has not ended.

In the eighth aspect of this invention, in addition to any of the third to sixth aspects, the predetermined timing in the step (c) includes a timing of the authentication request in the step (a).

In the ninth aspect of this invention, in addition to any of the third to eighth aspects, the timer makes an interruption to the processor every predetermined time repeatedly in a period that an interruption mask is reset, and the program causes the processor to reset the interruption mask in the step (b) and to set the interruption mask after the transmission in the step (c); and the predetermined timing in the step (c) is a timing of the interruption by the timer.

In the tenth aspect of this invention, an image forming system has a plurality of image forming apparatuses connected to a network, and a management server connected to the network. Each of the image forming apparatuses is the same as the image forming apparatus in any of the third to ninth aspects. The management server performs authentication for the unprocessed authentication information received from one of the image forming apparatus, and transmits an authentication result thereof to the image forming apparatus.

In the eleventh aspect of this invention, in addition to the tenth aspect, the management server has a storage unit that stores an email address of an administrator, and transmits email to the administrator if the authentication results in failure. The email contains information indicating unsuccessful authentication and the authentication information.

In the twelfth aspect of this invention, in addition to the eleventh aspect, the management server inserts information to the email if the authentication results in failure. The inserted information indicates whether or not a job log is received from the image forming apparatus. The management server also inserts content of a job log to the email if the job log is received from the image forming apparatus.

In the thirteenth aspect of this invention, in addition to the eleventh or twelfth aspect, the management server watches whether or not a total usage amount of a user ID exceeds a limit usage amount, and increases the total usage amount of a user ID corresponding to a job log received from the image forming apparatus by a usage amount indicated in the job log. The management server inserts information indicating an excess of the limit usage amount into the email if the total usage amount exceeds the limit usage amount after the total usage amount is increased.

According to the third or tenth aspect, even if the image forming apparatus does not have authentication information on all users, and the management server can not perform user authentication temporarily due to any reasons, a user can use the image forming apparatus, and unauthorised use can be prevented or controlled.

According to the fourth aspect, it is possible to identify a login attempting time and date of the unprocessed authentication information.

According to the fifth aspect, a job log is processed adequately with the authentication information not authenticated.

According to the sixth aspect, even if one user requests executing jobs after a temporal login, the image forming apparatus temporarily assigns a session ID and job IDs that should be assigned by the management server, and inserts this session ID and these job IDs with the unprocessed authentication information into job logs corresponding thereto. Therefore, after ex post authentication, the job logs are managed adequately in the management server.

According to the seventh aspect, if ex post authentication results in failure, a job that is being executed or has not been started is immediately stopped. Therefore, it is possible to prevent unauthorised use.

According to the eighth aspect, ex post authentication can be tried when next authentication is requested.

According to the ninth aspect, regardless of whether or not next authentication is requested, ex post authentication is tried periodically until the ex post authentication is finished for the unprocessed authentication information. Therefore, a job that is being executed or has not been started is immediately stopped, and it is possible to prevent unauthorised use.

According to the eleventh aspect, if ex post authentication results in failure, email is automatically transmitted to an administrator, and the email indicates the failure and the authentication information not authenticated. Therefore, it is possible to prevent unauthorised use of the image forming apparatus effectively.

According to the twelfth aspect, if ex post authentication results in failure, the email also indicates whether or not a job log is received, and content of the job log. Therefore, it is possible to prevent unauthorised use of the image forming apparatus more effectively.

According to the thirteenth aspect, even if ex post authentication results in success but the total usage amount exceeds the limit usage amount, the email indicates the excess. Therefore, it is possible to prevent unauthorised use.

In the fourteenth aspect of this invention, an image forming apparatus has a processor, a storage unit that stores a program, and a communication interface. The program causes the processor to write a log of a print job in the storage unit, to read out the log of an ended print job from the storage unit, and to transmit the log via the communication interface to a charge server connected to a network. Further, the program causes the processor to write information common to all pages of the print job in the log, and to write charge information in the log for every page of the print job when the page is printed.

In the fifteenth aspect of this invention, a charge server has a processor, a storage unit that stores a program, and a communication interface. The program causes the processor to receive a log of a finished job via the communication interface from an image forming apparatus, and to store the log in the storage unit. The log includes information common to all pages of the job and charge information of the respective pages printed. The program causes the processor to add a page count to the charge information of each of the pages, and to convert the charge information of k pages to that of one page with the page count of k if the charge information of k pages has the same k parts except for the page count.

In the sixteenth aspect of this invention, a charge server has a processor, a storage unit that stores a program, and a communication interface. The program causes the processor to receive a log of a finished job via the communication interface from an image forming apparatus, and to store the log in the storage unit. The log includes information common to all pages of the job and charge information of the respective pages printed. The charge information contains a page count. The program causes the processor to convert the charge information of k pages to that of one page with the page count of k if the charge information of k pages has the same k parts except for the page count.

According to the fourteenth aspect, information common to all pages of the print job is written in the log, and charge information is written in the log for every page of the print job when the page is printed. Therefore, even if one job includes both color printing and monochrome printing, or both duplex printing and simplex printing, or different sheet sizes and types, or a combination thereof, it is not complicated to generate a job log in the image forming apparatus. Consequently, process delay is prevented, and a cost to configure the apparatus can be reduced.

According to the fifteenth aspect, for a job log received by the charge server, a page count is added to the charge information of each of the pages, and the charge information of k pages is converted to that of one page with the page count of k if the charge information of k pages has the same k parts except for the page count. Therefore, it is unnecessary to perform the data compression process in the image forming apparatus, and consequently, process delay is prevented, and a cost to configure the system can be reduced.

According to the sixteenth aspect, the image forming apparatus adds a page count to charge information of each of pages, and consequently, it is not complicated to process the charge information in the charge server.

In the seventeenth aspect of this invention, an image forming apparatus has an input device, a communication interface connected to a management server on a network, a processor, and a storage unit that stores a database and a program. The database has a first user ID, a first password, usage limit information and other information that are related to each other. The program causes the processor to update the usage limit information corresponding to job execution and to maintain the usage limit information to obey a rule.

In order to cause a user of a second user ID to pretend to be a user of the first user ID locally, the program causes the processor to execute the steps of:

(a) transmitting authentication information that includes the second user ID via the communication interface to the management server, (b) overwriting the usage limit information with usage limit information received from the management server for the second user ID, and overwriting the other information with the second user ID, and (c) locally authenticating the user of the second user ID with authentication information that includes the first user ID and the first password to enable job execution.

In the eighteenth aspect of this invention, in addition to the seventeenth aspect, the program causes the processor to further execute the step of: (d) transmitting the second user ID and the usage limit information updated upon the end of the job execution to the management server.

According to the seventeenth aspect, the user of the second user ID can pretend to be a user of the first user ID. Therefore, existent programs can be used effectively to limit usage with referring to usage limit information when the image forming apparatus is connected to a network.

According to the eighteenth aspect, the usage limit information is updated upon the end of the job execution, and it is transmitted with the second user ID to the management server. Therefore, the management server understands that a user at the image forming apparatus is a user of the second user ID capable of logging in the management server.

These and other objects, features and advantages of the present invention will become more apparent upon reading of the following detailed description along with the accompanied drawings.

BRIEF DESCRIPTION OF THE DRAWINGS

FIG. 2 shows a user table stored in a storage device of a management server;

FIG. 3A shows a user table stored in a storage device of the image forming apparatus, and FIG. 3B shows a section management table stored in the storage device of the image forming apparatus;

FIG. 10 shows a diagram that indicates a job log described in XML;

FIG. 11 shows a diagram that indicates a job log generated by adding a page count corresponding to each of pages into the job log shown in FIG. 10;

FIG. 13 shows a diagram that indicates a job log in which charge information has been compressed according to the flowchart of FIG. 12;

DETAILED DESCRIPTION OF THE PREFERRED EMBODIMENT

Embodiment 1

Figure 6:
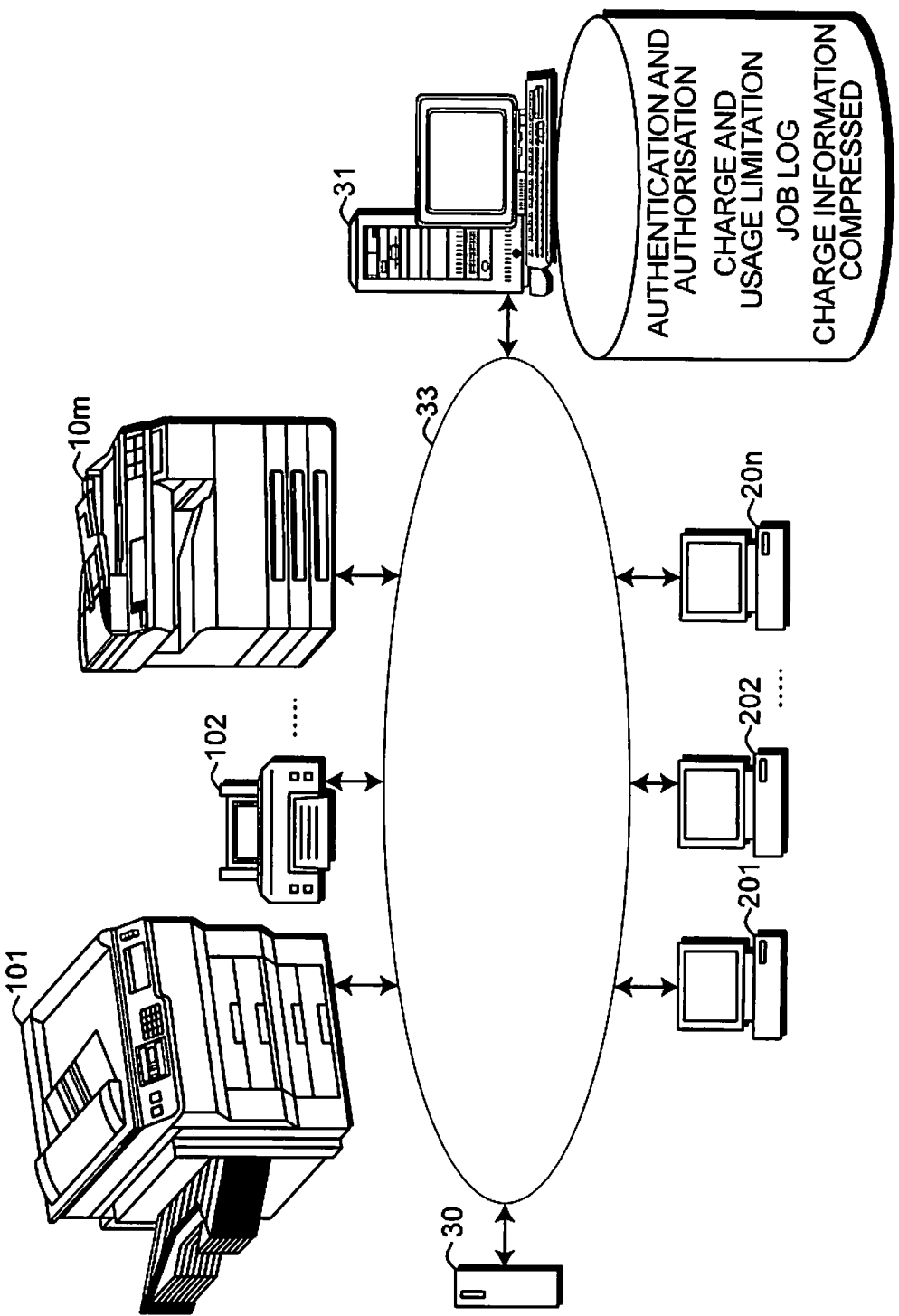
FIG. 6 shows a schematic block diagram of an image forming system.

FIG. 6 shows a schematic block diagram of an image forming system according to Embodiment 1 of this invention.

M image forming apparatuses 101 to 10m, n clients 201 to 20n, a print server 30, and a management server 31 are connected as nodes to a LAN (Local Area Network) 33. The image forming apparatus 10i (i=1 to m) is a multi function peripheral, a printer, a facsimile machine, or the like.

The print server 30 has a storage device that stores an OS (Operating System), a server program, and an application program to embody its functions. The OS includes printer drivers of the image forming apparatuses 101 to 10m, a print spooler, and a network interface driver. The network driver communicates with the clients 201 to 20n and the image forming apparatuses 101 to 10m, for example, according to LPR protocol.

FIG. 6 shows a case that the system has one print server 30, but it is also possible to set up print servers for respective groups of the image forming apparatuses which are exchangeable with each other, and to choose one in a ready state from the image forming apparatuses in a group.

Figure 7:
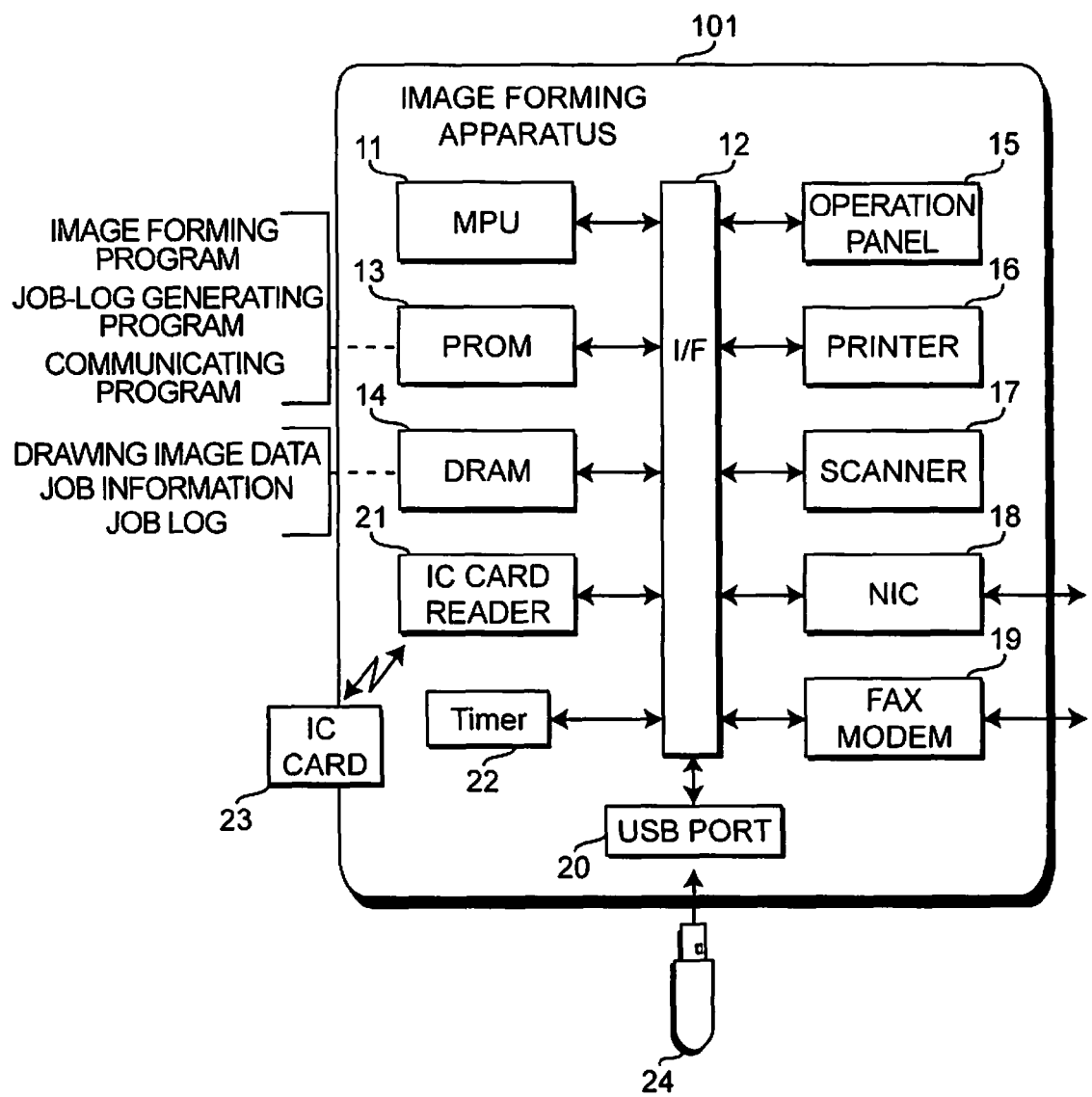
FIG. 7 shows a schematic block diagram that indicates hardware configuration of a multi function peripheral as the image forming apparatus.

FIG. 7 shows a schematic block diagram that indicates hardware configuration of a multi function peripheral as the image forming apparatus 101.

In the image forming apparatus 101, an MPU 11 is connected via interfaces 12 to a PROM 13, a DRAM 14, an operation panel 15, a printer 16, a scanner 17, a network interface 18, a FAX modem 19, a USB port 20, an IC card reader-writer 21, and a timer 22. In FIG. 7, for simplicity, a plurality of interfaces 12 is depicted as one block.

In the PROM 13 such as flash memory, an operating system (OS), programs to be executed in an upper layer of the OS, setting values, and a management table mentioned below have been stored.

The programs are executed in the image forming apparatus 101 to embody functions of a multi function peripheral. The functions include image forming functions, an authentication function, and a job log generation-transmission function. The image forming functions include copying, scanning, printing, transmitting and receiving facsimile data, and transmitting and receiving email. The authentication function is not used when the image forming apparatus 101 takes part in an image forming system.

In the PROM 13, a job log is also stored temporarily. After a careless power cut, the job log is still available.

The DRAM 14 is used as a work area for converting image data to bitmap data, and so on.

The operation panel 15 has a display unit and a key input unit, detects input of setting information or instruction, and displays a screen such as selection screen or setting screen.

The printer 16 has a print engine, a fuser, a paper feeding part, a paper transporting part, and a paper outputting part. The printer 16 forms an electrostatic latent image on a photoconductor drum in the print engine with bitmap data supplied as print data, develops it with toner, transfers the toner image onto a sheet, fixes the toner image, and outputs the sheet. The printer 16 may have a postprocessing device.

The scanner 17 is a device to input an image for copying and facsimile transmission. The FAX modem 19 is a communicating device for facsimile transmission and reception. The network interface 18 is connected to the LAN 33, and the FAX modem 19 is connected to a PSTN (Public Switched Telephone Network) not shown.

The IC card reader-writer 21 communicates wirelessly with an IC card 23 placed within a communicable area to transmit and receive signals, reads out an ID and a password of a user from the IC card 23, and outputs them as authentication information used to login the image forming apparatus 101. The MPU 11 reads this output.

The timer 22 is used for detecting current time and for a timer interruption to the MPU 11.

A USB memory 24 is capable of being connected to the port 20, and has a memory unit such as flash memory chip used to store a data file to be printed.

In the image forming system shown in FIG. 6, the management server 31 limits the total numbers of pages on respective user IDs. The image forming apparatus 101 is configured to be capable of performing section management in a standalone state. Therefore, the PROM 13 of the image forming apparatus 101 stores a section management program, a user table, and a section management table. These tables are used when the section management program is executed.

FIG. 3A shows a user table 35 stored in the PROM 13, and FIG. 3B shows a section management table 36 stored in the PROM 13.

The user table 35 contains fields of a user ID, a password, a user name, a section ID, and a user account type.

The section management table 36 contains fields of a section ID, a password, limit numbers of pages, the total numbers of pages, and so on. The number of pages here means the number of pages processed in image forming, i.e. the number of pages printed on sheets in printing or copying, the number of pages of which image data are generated in scanning, or the number of transmitted pages in facsimile transmission.

The limit numbers of pages are set corresponding to respective job types such as printing (i.e. copying or printing), image scanning, and facsimile transmission. For printing, the limit numbers of pages are set corresponding to "monochrome" printing, "color" printing, and "all" printing that includes monochrome printing and color printing.

The section management table 36 contains fields of the total numbers of pages and job restriction flags corresponding to the respective limit numbers of pages. Fields of the job restriction flags may be most significant bits in the respective fields of the total numbers of pages.

In an initializing process when power supply is started to the image forming apparatus 101, user information on a virtual user with a normal user account is registered in the user table 35, and section management information on a virtual section that the virtual user belongs is registered in the section management table 36. The virtual user and the virtual section are included in predetermined records, and may be an existing user and an existing section.

Figure 8:
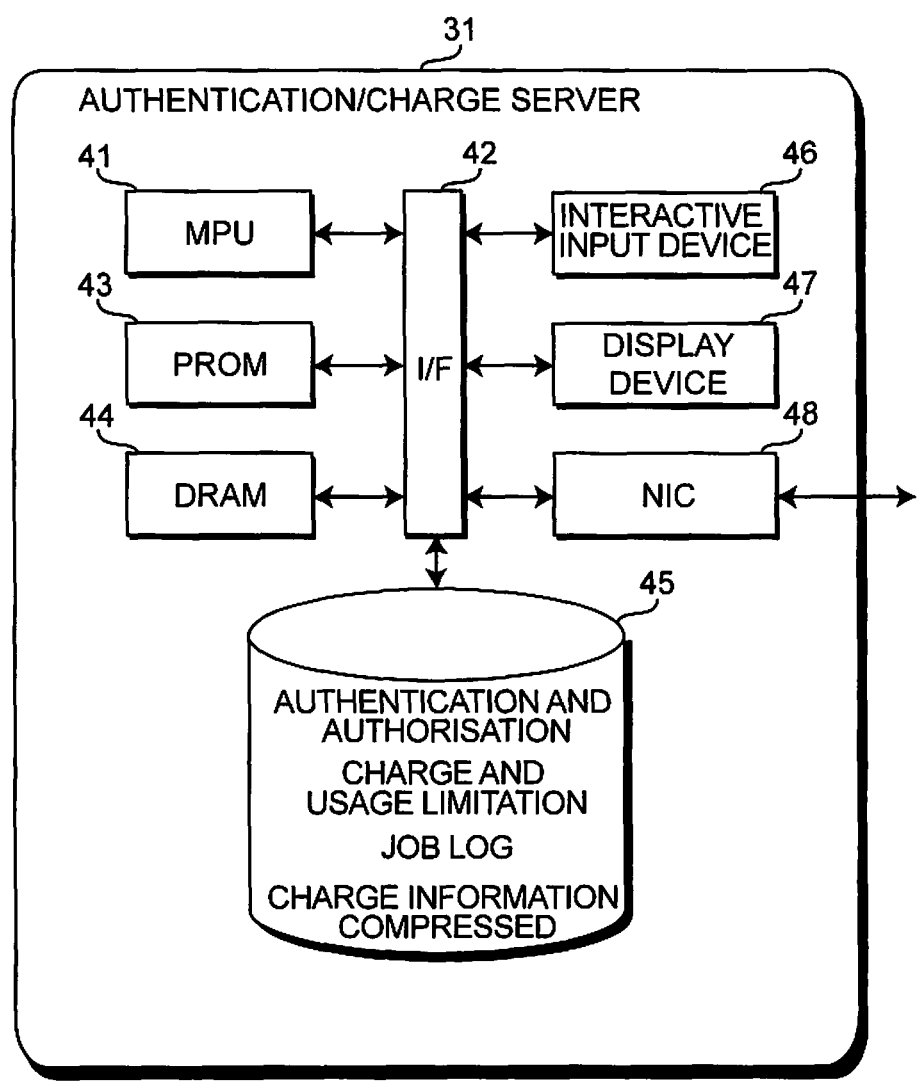
FIG. 8 shows a schematic block diagram that indicates hardware configuration of the management server.

FIG. 8 shows a schematic block diagram indicates hardware configuration of the management server 31.

This hardware configuration is based on an ordinary computer system. In the management server 31, an MPU 41 is connected via interfaces 42 to a PROM 43, a DRAM 44, an HDD 45, an interactive input device 46, a display device 47, and a network interface 48. In FIG. 8, for simplicity, the interfaces 42 are depicted as one block.

In the PROM 43, a BIOS and setting values of the BIOS have been stored. The DRAM 44 is used for a main memory device of a virtual memory system.

In the HDD 45, programs and data have been stored. The programs and data cause a server machine to function as the management server 31. A job log received from the image forming apparatus 101 is also stored in the HDD 45.

The programs include an OS such as server OS or general OS, a server program executable on the OS, and applications for performing authentication, charge management, and usage limitation.

The application for performing charge management includes a charge information compression program mentioned below. The application for performing usage limitation includes a program for counting the total number of usage pages on a user ID upon reception of a job log.

The data in the HDD 45 include a user table 34 and charge unit price information not shown. The user table 34 includes a user ID, a password, limit numbers of pages, the total numbers of pages and so on that are related to each other as shown in FIG. 2.

The limit numbers of pages are set corresponding to respective job types, and can be set as different values as well as in the section management table 36 shown in FIG. 3B. The user table 34 contains fields of the total numbers of pages and job restriction flags corresponding to the respective limit numbers of pages as well as in the section management table 36.

Figure 4:
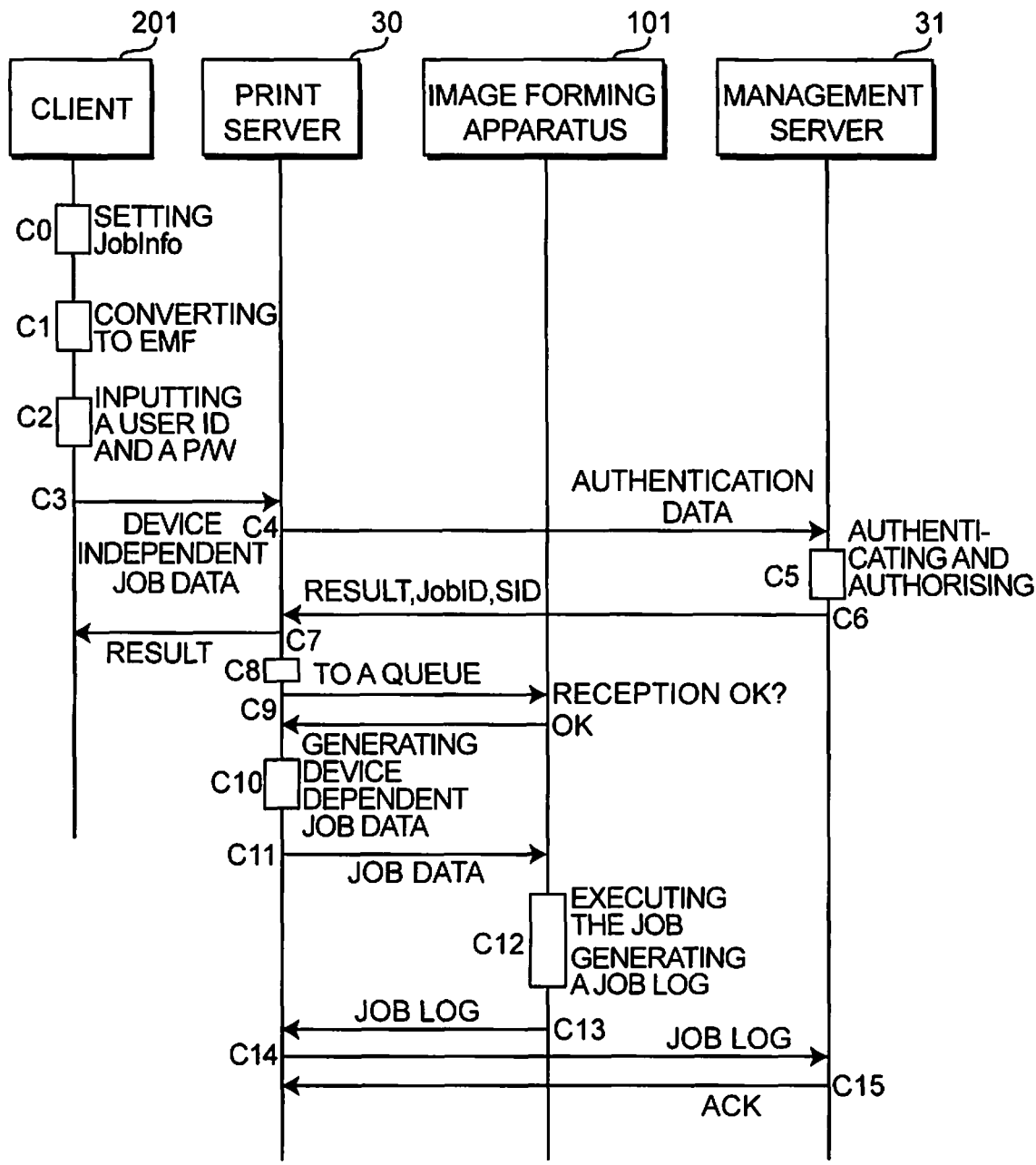
FIG. 4 shows a sequence diagram in the case that a client causes the image forming apparatus to execute a print job in a system shown in FIG. 6.

FIG. 4 shows a sequence diagram in the case that the client 201 causes the image forming apparatus 101 to execute a print job in the system shown in FIG. 6. In the following part, a process for executing a print job is explained without an explanation of data encryption and decryption, for simplicity.

(Step C0) a user starts an application program on the client 201, makes a document, and starts a printing manager of OS by choosing it in a printing menu. Consequently, a printing dialog is displayed. A user sets job information onto the printing dialog. The job information includes a page size, monochrome/color setting, layout information, the number of copies, a sheet type, and finisher setting information. The layout information includes aggregate printing setting such as "4 in 1," simplex/duplex, and so on. The sheet type indicates normal paper, recycled paper, or the like. The finisher setting information includes information on setting of postprocessing such as stapling and punching.

(Step C1) the user pushes down an OK button on the printing dialog, and upon this user operation, document data in the application is converted into a device independent EMF (Enhanced Meta File) file, for example, by a GDI (Graphic Device Interface) of the OS such as Windows (Registered trademark), and the aforementioned job information is attached to the EMF.

(Step C2) upon Step C1, the network interface driver is triggered, and a user authentication dialog is displayed as a pop up dialog. The user inputs a user ID and a password as authentication information into the dialog.

(Step C3) the user pushes down an OK button on the user authentication dialog, and upon this user operation, the authentication information is added into the job information. The EMF file attached the job information is transmitted as device independent print job data via the network interface 18 to the print server 30.

(Step C4) the print server 30 receives the device independent print job data, extracts a user ID and a password in the job information from the device independent print job data, and transmits the user ID and the password with job type data (i.e. printing) to the management server 31.

(Step C5) the management server 31 retrieves the user table 34 for a record that contains the user ID, and determines whether or not the received password is the same as that in the found record. If it is determined that the passwords are the same, the management server 31 reads out values of the job restriction flags Ft, Fm, and Fc of "all" (i.e. total of monochrome and color), "monochrome" and "color" from the record.

Initial values of the job restriction flags are set as zero that indicates permission of job execution. Mentioned below is a process to set the values of the flags as 1 that indicates restriction of job execution.

(Step C6) if it is determined that the passwords are the same (i.e. successful authentication), and Ft=0 and none of Fm and Fc is 1 (i.e. successful authorisation), the management server 31 assigns a job ID and a session ID. The session ID is to identify a series of processes from login to logout of this user. To the print server 30, the management server 31 transmits the job ID and the session ID with the result of authentication and authorisation, the limit numbers of pages on printing and the total numbers of pages on printing. Otherwise, the management server 31 transmits the result of authentication and authorisation to the print server 30.

(Step C7) the print server 30 transmits the result of authentication and authorisation to the image forming apparatus 101, as a response to the transmission in Step C3.

(Step C8) if the user authentication results in success, the print server 30 puts the job ID and the user ID that are related to each other into a job queue.

(Step C9) the print server 30 takes a job ID out of the job queue in FIFO order, and inquires to one or more image forming apparatuses corresponding to the job ID whether or not a job can be received.

(Step C10) if the print server 30 receives a response from an image forming apparatus, and the response indicates that a job can be received, the print server 30 converts an EMF file and job information included in device independent print job data of this job ID into data described in a device dependent PDL (Page Description Language) and data described in a device dependent PJL (Print Job Language), respectively. The print server 30 attaches the session ID and the job ID to the converted job information, and generates device dependent print job data by combining them.

(Step C11) the print server 30 transmits the device dependent print job data to an image forming apparatus corresponding thereto, e.g. the image forming apparatus 101 in this embodiment.

(Step C12) the image forming apparatus 101 puts this job into a queue to keep the job in a waiting state, and starts executing an image forming process of the job when the job becomes in a ready state. The image forming apparatus 101 generates a job log and performs total page usage limitation management while it is executing the process.

(Step C13) the image forming apparatus 101 transmits the job log to the print server 30 when the job is finished.

(Step C14) the print server 30 transmits the job log to the management server 31.

(Step C15) to indicate that the job log is received, the management server 31 transmits an acknowledgement to the print server 30.

The management server 31 assigns and writes a billing ID BillingID to the received job log, and increases the total numbers of pages of ALL, MONOCHROME and COLOR in the user table 34 by the numbers of pages of ALL, MONOCHROME and COLOR processed in the job. The numbers of pages are identified with the charge information in the job log. Further, the management server 31 compares the total numbers of pages with the respective limit numbers of pages, and changes the job restriction flag of the total number to 1 if the total number exceeds the limit number corresponding thereto.

Figure 5:
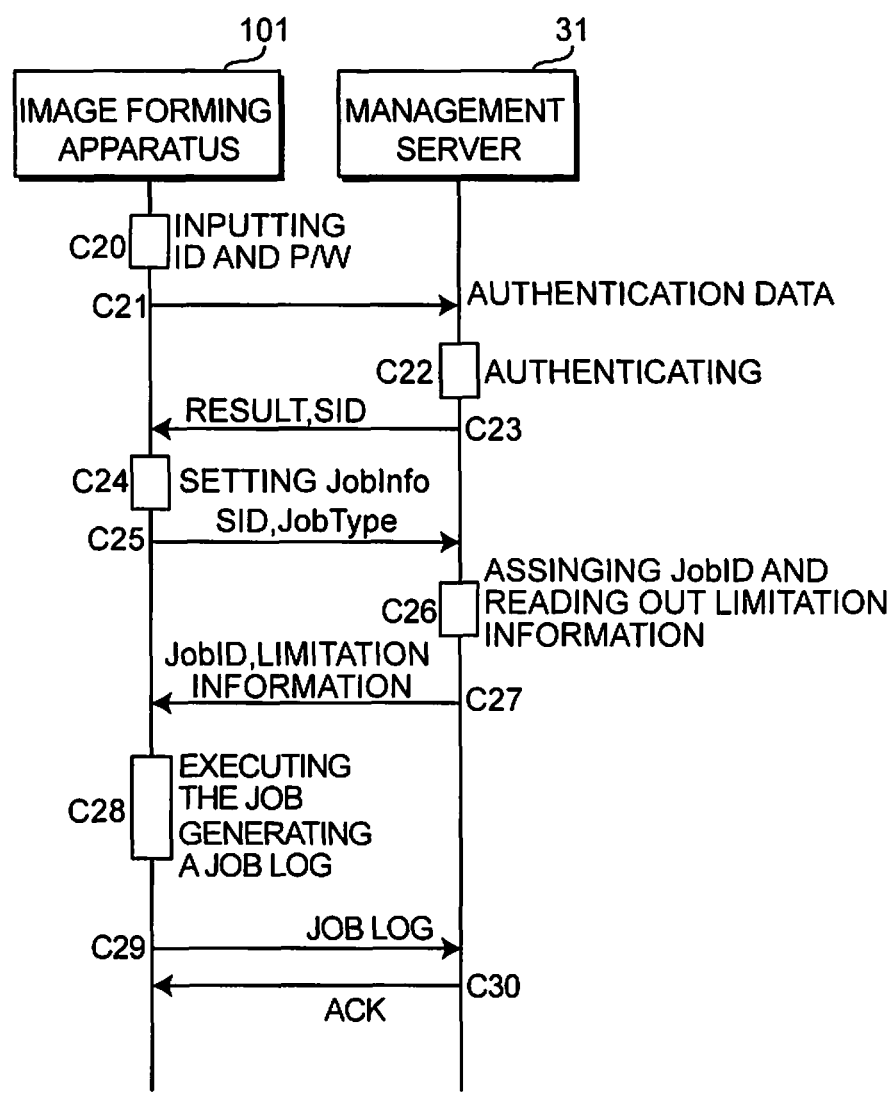
FIG. 5 shows a sequence diagram in the case that the image forming apparatus executes a copy job, a facsimile transmission job, or a print job of a file stored in a USB memory according to a user operation to an operation panel on the image forming apparatus.

FIG. 5 shows a sequence diagram in the case that the image forming apparatus 101 executes a copy job, a facsimile transmission job, or a print job of a file stored in a USB memory according to a user operation to the operation panel 15 on the image forming apparatus 101.

(Step C20) a user pushes down a start key to make the image forming apparatus 101 be in a ready state, and a user authentication screen is displayed as a pop up screen on the operation panel 15. The user inputs a user ID and a password by operating the operation panel 15. Instead of inputting manually, it is possible to input them automatically by making the IC card 23 approach the IC card reader-writer 21.

(Step C21) the image forming apparatus 101 transmits the user ID and the password to the management server 31.

(Step C22) the management server 31 performs user authentication as mentioned above, and assigns a session ID if the user authentication results in success.

(Step C23) if the user authentication results in success, the management server 31 transmits the session ID with the authentication result to the image forming apparatus 101. If the user authentication results in failure, the server 31 transmits the authentication result to the image forming apparatus 101.

(Step C24) if the user authentication results in success, the image forming apparatus 101 allows the user to input a service request. The user chooses a job type of a job to be executed, and inputs setting information, then pushes down the start key to start the job.

(Step C25) upon the user operation, the image forming apparatus 101 transmits the job type with the session ID to the management server 31.

(Steps C26 and C27) the management server 31 receives them, assigns a job ID to the job, retrieves the user table 34 shown in FIG. 2 for a record that contains the user ID, reads out the limit numbers of pages, the total numbers of pages, and the job restriction flags corresponding to the job from the record, and transmits the limit numbers of pages, the total numbers of pages, and the job restriction flags with the user ID to the image forming apparatus 101.

Figure 1A:
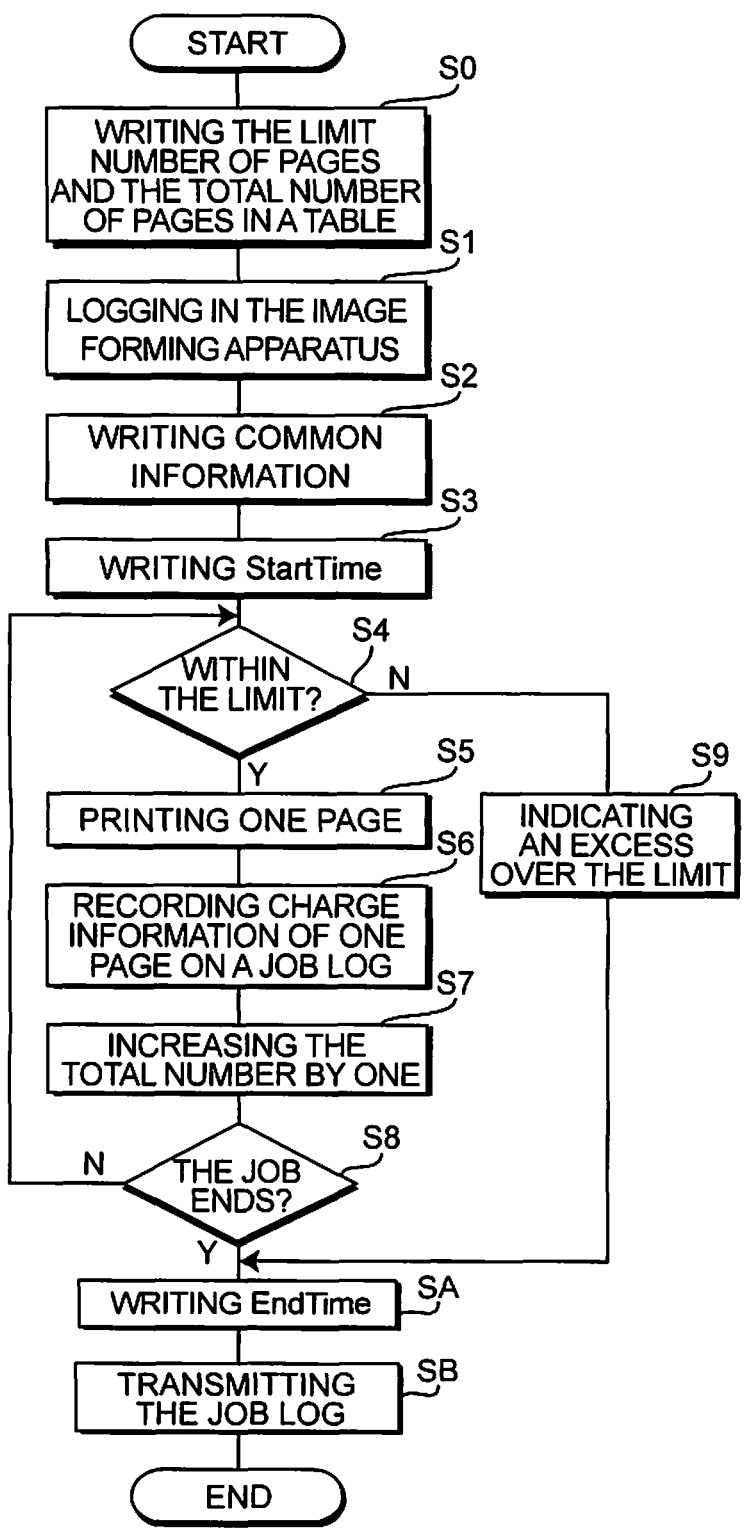
FIG. 1A shows a flowchart that indicates a process of a job log in an image forming apparatus according to Embodiment 1 of this invention.

(Step C28) the image forming apparatus 101 receives them; then it starts processing the job as shown in FIG. 1A.

Steps S1 to SA in FIG. 1A are a process in terms of the section management program. This process generates a job log of every page when the page is finished printing, and limits the total numbers of pages of a section ID corresponding to a section that the user belongs not to exceed the limit numbers corresponding to the section ID.

In Embodiment 1, a process of Step S0 in FIG. 1A has been attached to the section management program, and therefore, the section management program is effectually used as a user management program.

(Step S0) in preprocessing (as characteristic of this technique), the image forming apparatus 101 overwrites a user name in a record of "No=2" in the user table 35 with the user ID used for the management server 31, and overwrites the one or more limit numbers, the one or more total numbers and the one or more job restriction flags corresponding to the job type in a record of "No=1" (i.e. a record that contains the section ID contained in the record of "No=2" in the user table 35) in the section management table 36 with those received from the management server 31. For example, if the job type is copying, overwritten are the limit numbers of pages of "all", "monochrome" and "color", the total numbers of pages corresponding thereto, and the job restriction flags corresponding thereto.

(Step S1) the image forming apparatus 101 performs an automatic login to itself internally using a user ID and a password in a record of "No=2" in the user table 35 to allow job execution.

It should be noted that it is not favorable that a login process is skipped in the program, since the program can be modified to pass in login without authentication in terms of reverse assembling and tracing.

In general, a user can pass in a login with only a user ID without a password in some settings. However, in the aforementioned Step C22, a user can not locally login the image forming apparatus 101 with only his/her user ID. Accordingly, prevented is unauthorised use of the image forming apparatus 101 disconnected from the management server 31.

As mentioned above, a user name in a record of No=2 in the user table 35 is overwritten with the input user ID used for authentication in the management server 31. Therefore, a set of a user ID and a password that has been registered in the user table 35 can be used for whomever of users, and the user is identified with the overwritten user name.

(Step S2) job log information common to all pages is written in the job log file 32 shown in FIG. 2. This common information includes a job ID, a session ID, a user ID, and a job type (copying, printing, facsimile transmission, or the like) that are identified with the received job data.

(Step S3) a job starting time and date StartTime of the job is written in the job log file 32. StartTime is obtained with referring to the timer 22.

(Step S4) for example, for copying, a value of monochrome/color setting is identified with input on the operation panel 15, and the limit number and the total number corresponding to the value (i.e. monochrome or color) are compared, and the limit number and the total number corresponding to "all" are compared. If none of these total numbers exceeds these respective limit numbers, Step S5 is executed next; otherwise, Step S9 is executed next.

(Step S5) the image forming apparatus 101 controls a laser diode based on image data scanned from a document to modulate a laser beam, forms an electrostatic latent image on a photoconductor drum by partially removing electric charge on the photoconductor with the laser beam, develops it with toner, transfers the toner image onto a sheet, fixes the toner image, and outputs the sheet onto a tray.

Figure 1B:
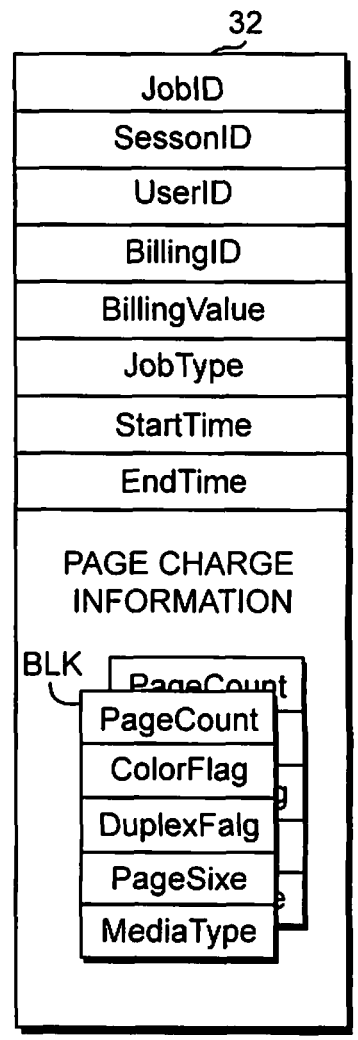
FIG. 1B shows a diagram for explaining Step S6 in FIG. 1A.

(Step S6) the image forming apparatus 101 writes charge information of one page in the job log file. The charge information includes at least one information block BLK. For example, as shown in FIG. 1B, the information block BLK consists of the number of pages PageCount, a color flag ColorFlag, a duplex printing flag DuplexFlag, a page size PageSixe such as A3, A4, B4, B5, Letter, Ledger, Legal or the like, and a sheet type such as normal paper, recycled paper, glossy paper or the like. ColorFlag is set as either 1 in case of color or zero in case of monochrome. DuplexFlag is set as either 1 for duplex printing or zero for simplex printing. An information block BLK of the first page is generated to contain all of these components, and PageCount in it is set as 1. For the second page or a page after the second page, if an existent information block is the same as an information block of a current page except for PageCount, PageCount in the existent information block is increased by 1; otherwise, a new information block is generated of the current page.

(Step S7) the image forming apparatus 101 increases one or more total numbers corresponding to the job in the section management table 36 by 1. For example, if the job type is monochrome copying, the total numbers of pages of "all" and "monochrome" are increased by 1, respectively.

(Step S8) if any page in the job has not been printed, Step S4 is executed next; otherwise, Step SA is executed next.

(Step S9) the image forming apparatus 101 sets one or more job restriction flags corresponding to the job as 1, indicates an excess over the limit number of pages on the operation panel 15, and stops the job; then it executes Step SA next.

(Step SA) a job ending time and date EndTime of the job is written in the job log file 32. EndTime is obtained with referring to the timer 22.

(Step SB, i.e. Step C29 in FIG. 5) the image forming apparatus 101 transmits the job log file 32 generated as mentioned above to the network interface 48 of the management server 31 using a driver of the OS and the network interface 18.

(Step C30) the management server 31 receives the job log, and transmits an acknowledgement to the image forming apparatus 101.

The management server 31 assigns and writes a BillingID to the received job log, and increases the total numbers of pages in the user table 34 by the respective numbers of usage pages in the job (in case of copying, the respective numbers of usage pages of "all", "monochrome" and "color"). The numbers of pages are identified with the charge information in the job log. Further, the management server 31 compares the total numbers of pages with the respective limit numbers of pages, and changes the job restriction flag of the total number to 1 if the total number exceeds the limit number corresponding thereto.

In Embodiment 1, a user name in a predetermined record in the user table 35 is overwritten with the input user ID used for authentication in the management server 31, a record that contains a section ID contained by the predetermined record is identified in the section management table 36, and one or more limit numbers, one or more total numbers and one or more job restriction flags in the record are overwritten with those received from the management server 31. The image forming apparatus 101 locally performs an automatic login of a user with the predetermined record to allow job execution. Therefore, the image forming apparatus 101 causes a user with a user ID of the management server 31 to pretend to be a user with a local user ID of the image forming apparatus 101.

According to this non-complex configuration, the section management program is effectually used as a user management program. Therefore, simplified is software configuration of the image forming apparatus that performs either section management or user management according to its usage situation, and its product cost is reduced.

Embodiment 2

Information on charge to printing includes information on whether color printing or not, information on whether duplex printing or not, a page size, and sheet type. Some jobs contain both color printing and monochrome printing, or both duplex printing and simplex printing, or different sheet sizes and types. In these cases, when every page is finished printing, it is determined whether or not charge information of the page is the same as any of the existent information blocks BLK, and if charge information of the page is different from all of the existent information blocks BLK, a new information block BLK is generated of the page. Therefore, processes to be executed when every page is finished printing are complicated.

In FIG. 6, the image forming apparatuses 101 to 10m sometimes stay in a waiting state due to job concentration. On the other hand, processes in the management server 31 are relatively light, and the management server 31 can perform the charge management in an idle time.

Thus, it is favorable to the whole system that the management server 31 shrinks the charge information that contains the same parts corresponding to respective pages, rather than the image forming apparatus 10i does it.

In Embodiment 2, the image forming apparatus 101 writes the charge information of a page (i.e. page charge information PageInfo) into a job log XML file 320 shown in FIG. 10 in the PROM 13 when every page is finished printing. "0" in the last line in FIG. 10 is a code that indicates the end of the file.

Figure 9:
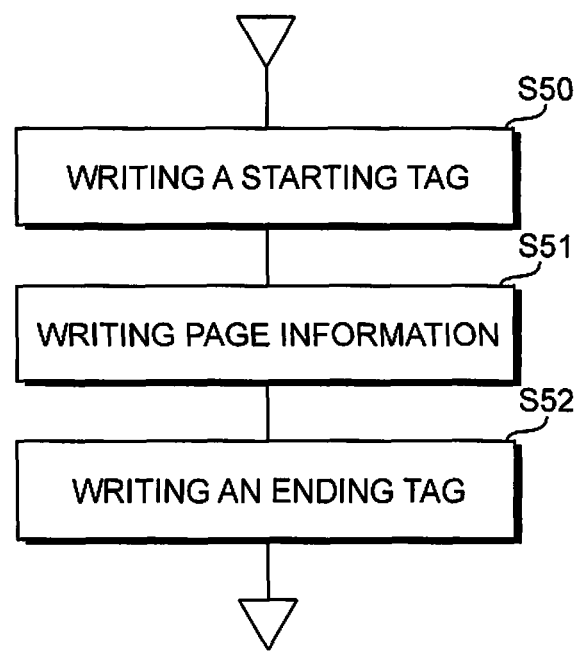
FIG. 9 shows a flowchart of a part in Embodiment 2 corresponding to Step S6 of FIG. 1A.

FIG. 9 shows a flowchart of a part corresponding to a process to generate page charge information in Embodiment 2 of this invention. This process is executed instead of Step S6 of FIG. 1A.

(Step S50) the image forming apparatus 101 writes a starting tag <PageInfo> of page charge information PageInfo in the job log XML file 320.
(Step S51) next to the tag, the image forming apparatus 101 writes charge data of the page in the job log XML file 320. The page charge information is the same as the information block BLK shown in FIG. 1B except for PageCount, and has a color flag, a duplex printing flag, a page size, and a sheet type.
(Step S52) next to the charge data (i.e. page information for the charge), the image forming apparatus 101 writes an ending tag </PageInfo> of the page charge information PageInfo in the job log XML file 320.

According to this configuration, even if one job includes both color printing and monochrome printing, or both duplex printing and simplex printing, or different sheet sizes and types, or a combination thereof, the image forming apparatus 101 only writes PageInfo in the job log XML file 320 when every page is finished printing.

Consequently, it is not complicated to generate a job log in the image forming apparatus, process delay is prevented, and a cost to configure the apparatus can be reduced.

As shown in FIG. 11, the management server 31 attaches the page count PageCount next to the starting tag of PageInfo in the received job log XML file, and sets the initial value of the page count as 1 in order to generate a job log XML file 320A from the received one. The image forming apparatus 101 may attach an item of PageCount to the job log XML file.

Figure 12:
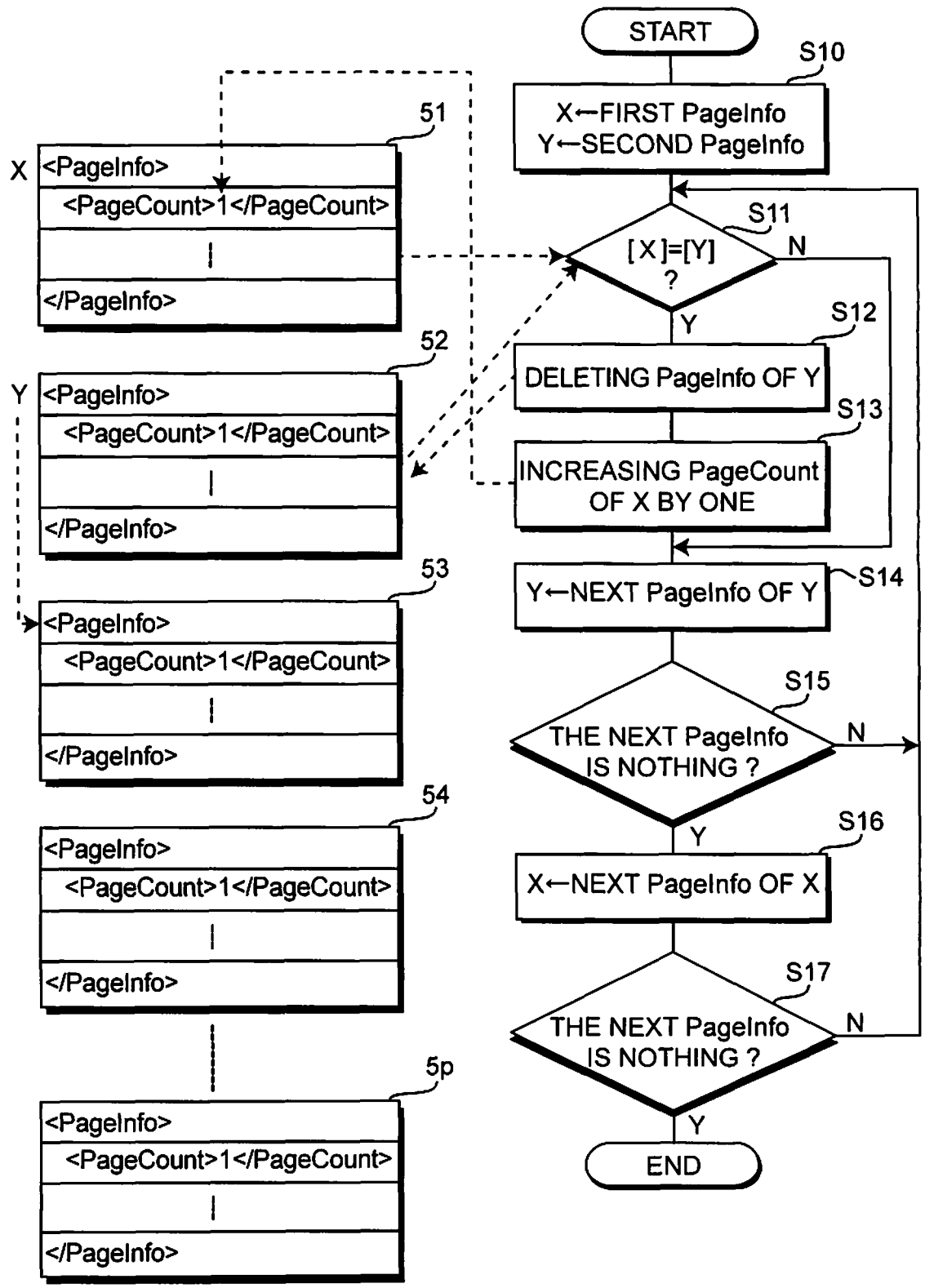
FIG. 12 shows a flowchart that indicates a compression process of charge information in a job log by a management server.

FIG. 12 shows a flowchart that indicates a compression process of charge information in a job log by the management server 31.

(Step S10) the management server 31 sets the top address of the first page charge information PageInfo to a variable X, and sets the top address of the second page charge information PageInfo to a variable Y.
(Step S11) if [X]=[Y], Step S12 is executed next; otherwise, Step S14 is executed next. Here, [X] means the remaining part other than the page count in the page charge information PageInfo that the top address is equal to X.
(Step S12) the management server 31 deletes the page charge information PageInfo that the top address is equal to Y.
(Step S13) the management server 31 increases the page count PageCount in the PageInfo that the top address is equal to X by 1.

By executing this process one time, the page charge information PageInfo 52 is deleted and the page count PageCount of the page charge information PageInfo 51 is changed to 2, if the page charge information PageInfo 51 and PageInfo 52 is the same except for the page counts PageCount.
(Step S14) the management server 31 sets the top address of next page charge information PageInfo to the variable Y.
(Step S15) if in Step S14 the next page charge information PageInfo is not found, Step S16 is executed next; otherwise, Step S11 is executed next.
(Step S16) the management server 31 sets the top address of next page charge information PageInfo to the variable X.
(Step S17) if in Step S16 the next page charge information PageInfo is not found, the compression process shown in FIG. 12 ends; otherwise, Step S11 is executed next.

As a result, this process compresses the page charge information in the job log XML file.

The management server 31 calculates a billing amount BillingValue of this job based on the job log XML file and the charge unit price information stored in the HDD 45, and writes the billing amount in the job log XML file to generate a complete job log XML file 320B as shown in FIG. 13.

The other processes in Embodiment 2 are the same as those in Embodiment 1.

In Embodiment 2, for a job log XML file 320 received by the management server 31, a page count is added to the page charge information PageInfo, and the page charge information of k pages is converted to that of one page with the page count of k if k parts corresponding to k pages in the page charge information are the same except for the page count. Therefore, it is unnecessary to perform the data compression process in the image forming apparatus, and consequently, process delay is prevented, and a cost to configure the system can be reduced.

In addition, the image forming apparatus adds an item of a page count (e.g. tags "<PageCount></PageCount>" without a value) to page charge information, and consequently, processing the charge information in a charge server (i.e. the management server) is simplified.

Embodiment 3

When the management server 31 can not receive a job log due to a power cut or a program crash in the management server 31 or the image forming apparatus, a problem on a wired/wireless connection, or the like, i.e. when the image forming apparatus does not receive the acknowledgement in Step C30 of FIG. 5, in general, the image forming apparatus repeatedly transmits the job log to the management server 31 until it receives an acknowledgement. Therefore, the image forming apparatus does not start executing a next job until it receives an acknowledgement.

However, in Embodiment 3, if the image forming apparatus 101 does not receive an acknowledgement within a predetermined time after transmitting a job log to the management server 31, it stores the job log in the PROM 13 temporarily, and transmits the temporarily stored job log (i.e. the unprocessed job log) with a next job log to the management server 31 when a next job is finished.

Figure 14:
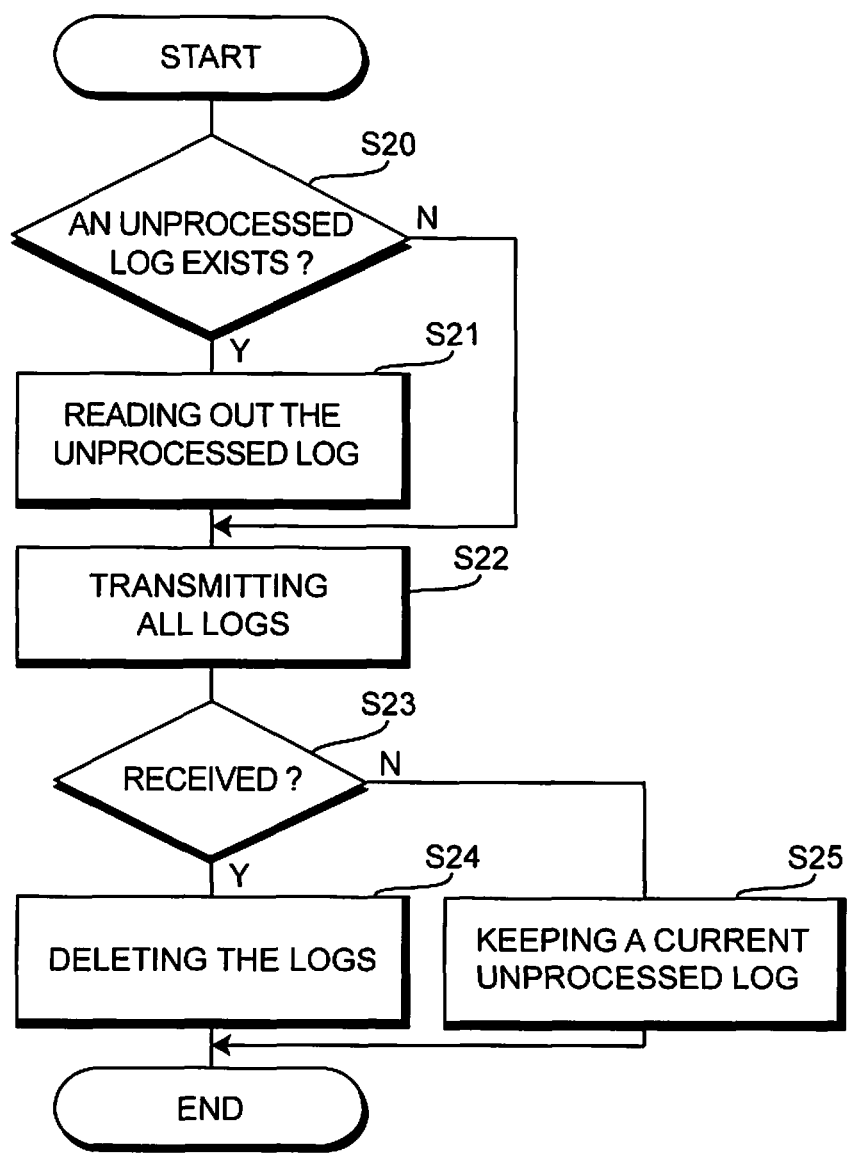
FIG. 14 shows a flowchart that indicates a job log transmission process from an image forming apparatus to a management server in Embodiment 3 of this invention.
Figure 15:
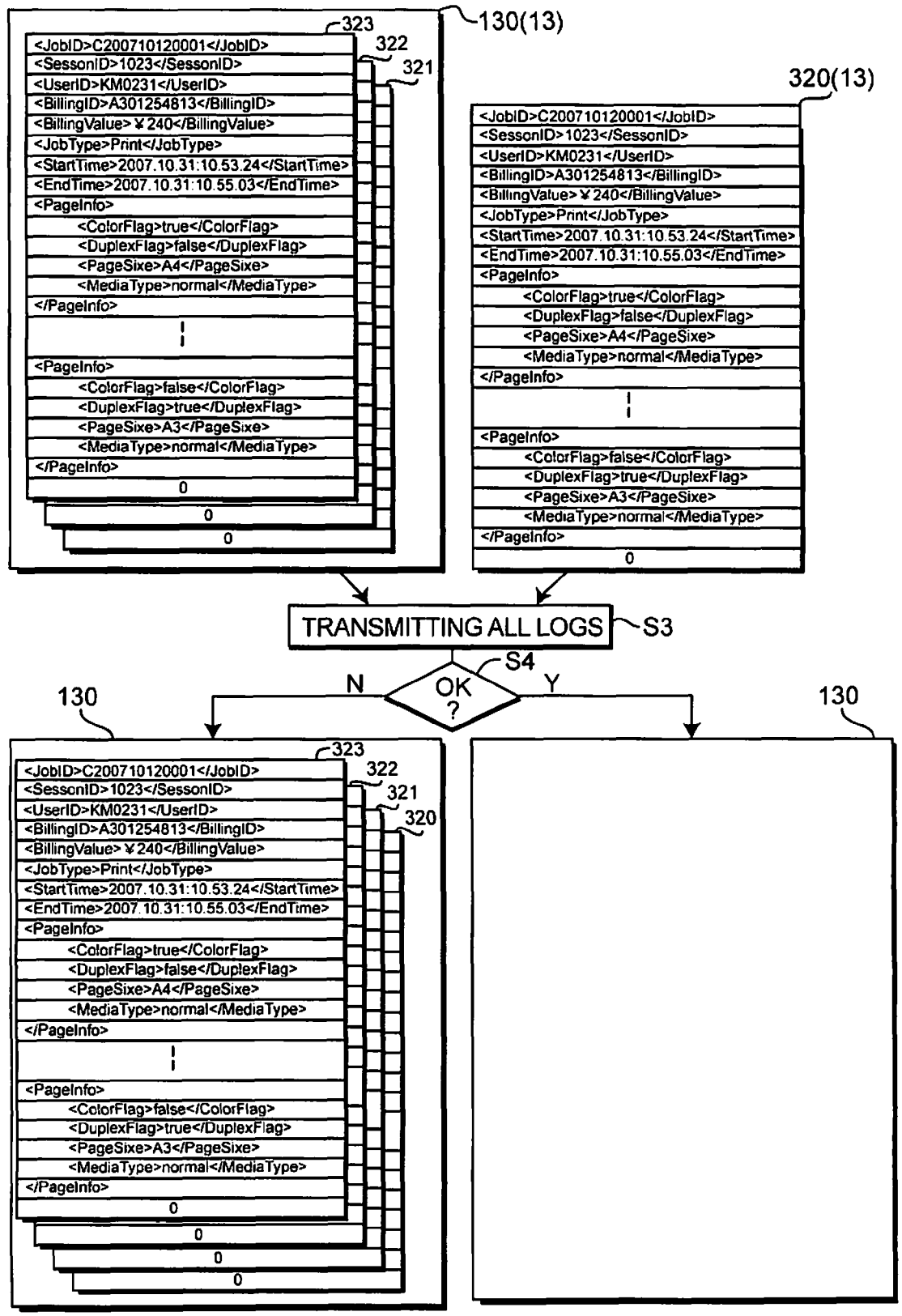
FIG. 15 shows a diagram for explaining the process in the flowchart of FIG. 14.

FIG. 14 shows a flowchart of detailed processes in Steps C29 and C30 of FIG. 5.
(Step S20) the image forming apparatus 101 determines whether or not at least one unprocessed job log is stored in a buffer area 130 of the PROM 13 as shown in FIG. 15. If it is determined that at least one unprocessed job log is stored, Step S21 is executed next; otherwise, Step S22 is executed next.

(Step S21) the image forming apparatus 101 transmits one or more job log XML files temporarily stored in the buffer area 130 to the management server 31.

(Step S22) the image forming apparatus 101 transmits a job log XML file of the current job to the management server 31.

(Step S23) if the image forming apparatus 101 receives an acknowledgement from the management server 31 within a predetermined time after transmitting one or more job log XML files, Step S24 is executed next; otherwise, Step S25 is executed next.

(Step S24) the image forming apparatus 101 deletes the job log XML file 320 of the current job, and one or more job log stored in the buffer area 130; then the process shown in FIG. 14 ends.

(Step S25) the image forming apparatus 101 adds the job log XML file 320 of the current job into the buffer area 130; then the process shown in FIG. 14 ends.

The other processes in Embodiment 3 are the same as those in Embodiment 1 or 2.

In Embodiment 3, even if the management server 31 can not receive a job log due to server down, disconnection in a wired/wireless network, or the like, the image forming apparatus keeps the job log in a storage device, and transmits the kept job log to the management server 31 when transmitting a next job log of a next job. Therefore, the image forming apparatus can immediately handle a next process, and the management server 31 can perform charge management.

It should be noted that the aforementioned processes can be applied to processes in Steps C14 and C15 of FIG. 4.

Embodiment 4

Figure 16:
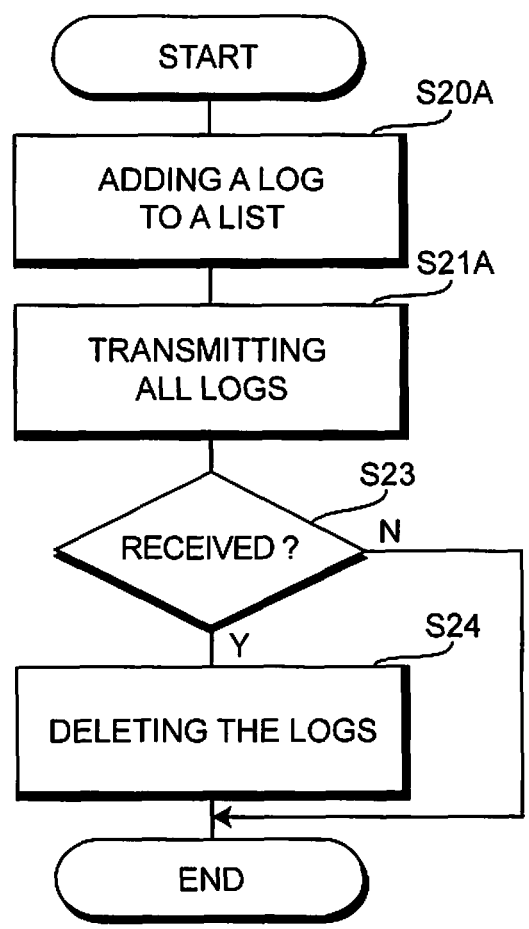
FIG. 16 shows a flowchart in Embodiment 4 corresponding to FIG. 14.

FIG. 16 shows a flowchart in Embodiment 4 corresponding to FIG. 14.

This flowchart has Steps S20A and S21A instead of Steps S20 to S22 in FIG. 14, and does not have any step same as Step S25 in FIG. 14.

Figure 17:
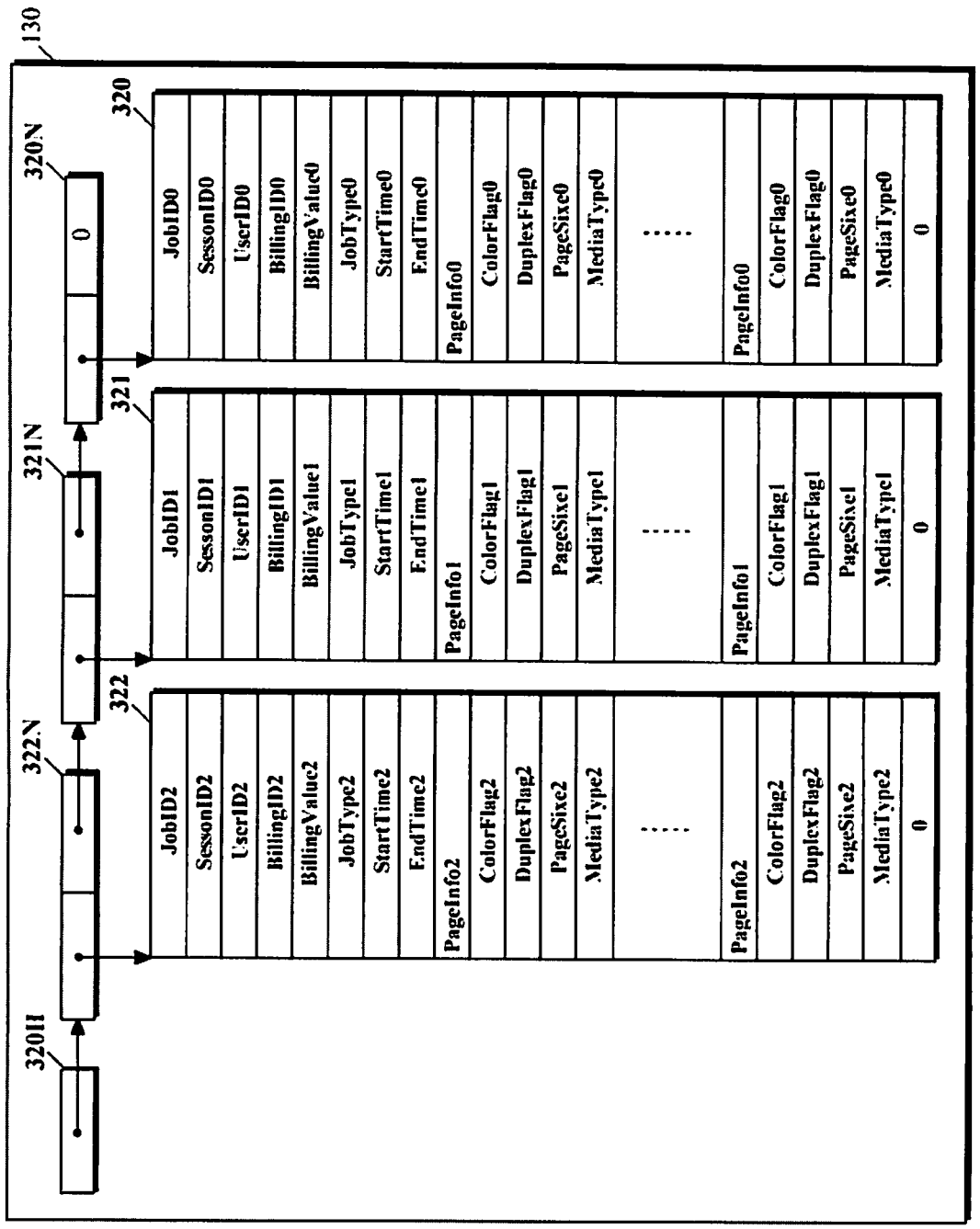
FIG. 17 shows a diagram for explaining the process in the flowchart of FIG. 16.

In FIG. 17, if the buffer area 130 contains the job logs that have not been transmitted, nodes 320N to 322N are serially linked to a pointer part of a headnote 320H, and the job log XML files 320 to 322 are linked to respective data parts of the nodes 320N to 322N with pointers to the files 320 to 322. As a result, a linked list is generated. The data parts may contain file names of the files 320 to 322. The nodes 320N to 322N may be structure variables that contain the pointer parts and the data parts, and the data parts contain the job log XML files 320 to 322, respectively. If the buffer area 130 does not contain any job logs, the pointer part of the headnote 320H is set as zero. As a result, a NULL liked list (i.e. without a reference) is generated.

In Step S20A, the job log XML file 320 of the current job is liked to the linked list (or the headnote 320H).

In Step S21A, the image forming apparatus 101 reads out all job logs from the list, and transmits the job logs to the management server 31. If in Step S23 the image forming apparatus 101 does not receive an acknowledgement on the job logs from the management server 31 within a predetermined time after transmitting the job logs, a process like Step S25 is not executed here. On the other hand, if in Step S23 the image forming apparatus 101 receives the acknowledgement from the management server 31 within the predetermined time, the linked list is deleted and the headnote 320H is set as zero.

The other processes in Embodiment 4 are the same as those in Embodiment 3.

In Embodiment 4, the image forming apparatus 101 serially links the job logs that have not been transmitted and a job log of a finished current job, and transmits all the linked job logs to the management server 31. Therefore, regardless of whether or not the management server 31 can receive a job log from the image forming apparatus 101, the image forming apparatus 101 attaches a job log of a current job to the unprocessed job log in the same manner. Consequently, processes in the management server 31 are not complicated.

Embodiment 5

In general, when the management server 31 can not perform user authentication due to a program crash, disorder on a communication path, or the like, a user can not use the image forming apparatuses 101 to 10$m$.

In the case that many users can choose and use whichever of the image forming apparatuses, the image forming apparatus can not store the user table 34 as shown in FIG. 2 of all user IDs in an internal memory if the image forming apparatus does not has any external storage devices, and the internal memory is not large enough. In addition, even if the user table 34 can be stored in the internal memory, since one of the users can use a plurality of image forming apparatus, the total numbers of usage pages by the user can not be obtained at one place.

However, probability that the management server 31 is not available is generally very low.

In Embodiment 5, when the management server 31 is not available for user authentication, the image forming apparatus 101 temporarily enables a user to use it under an assumption that the user passed authentication. Afterward, when the management server 31 becomes available, the image forming apparatus 101 causes the management server 31 to immediately perform ex post authentication to prevent unauthorised use.

Figure 20:
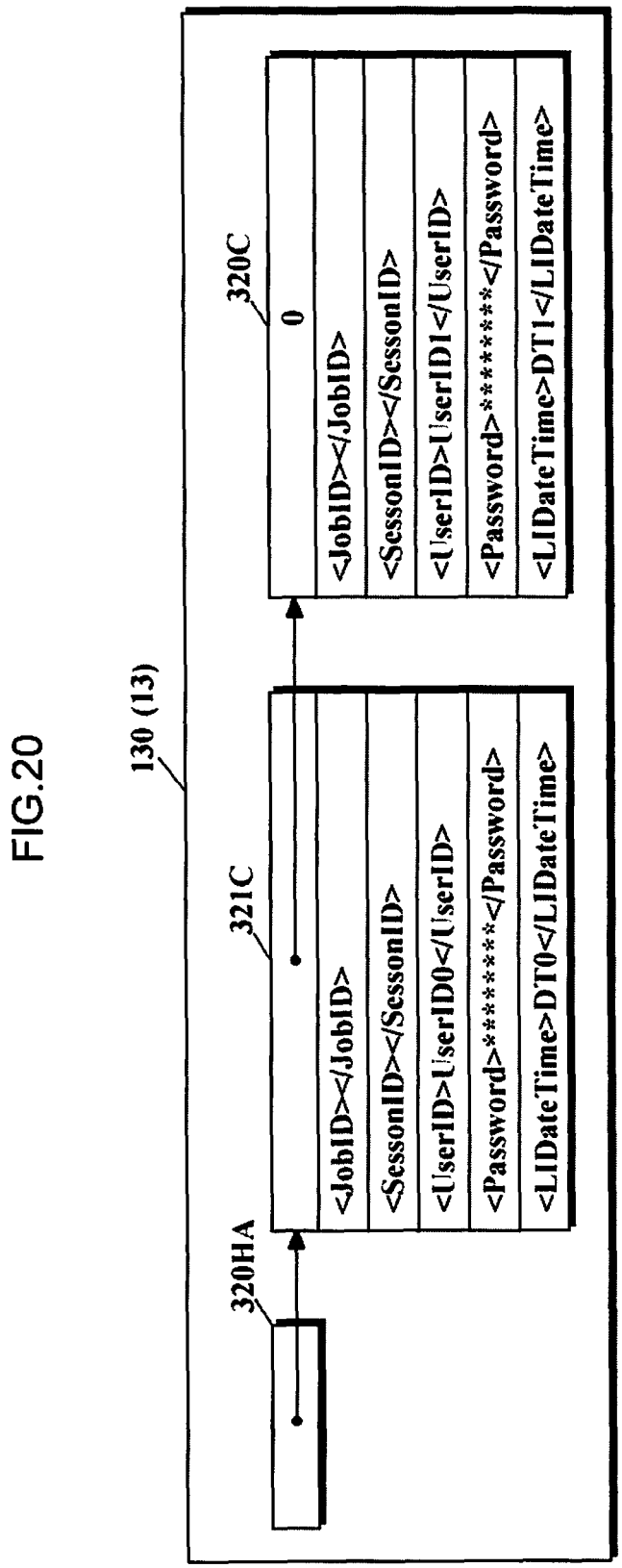
FIG. 20 shows a diagram that indicates authentication information stored, as well as the case shown in FIG. 17, in a buffer area of a PROM in the image forming apparatus when user authentication in the management server is not available.

FIG. 20 shows a diagram that indicates authentication information stored, as well as the case shown in FIG. 17, in the buffer area 130 of the PROM 13 when user authentication in the management server 31 is not available. In FIG. 20, a structure variable 321C and a structure variable 320C are serially linked to a headnote 320HA.

Each of the structure variables 320C and 321C has a link part and a data part. Components of the data part are a temporal job ID, a temporal session ID, a user ID, a password, and a login attempting time and date LIDateTime. When the management server 31 is available, the management server 31 assigns a job ID and a session ID. However, when the management server 31 is not available, the image forming apparatus 101 assigns a temporal job ID and a temporal session ID. A job log corresponding to the structure variable 320C or 321C is related to the same temporal job ID and the same temporal session ID. The login attempting time and date is used for an administrator at the management server 31 to confirm it. Initial values of the temporal job ID and the temporal session ID are NUL, and the image forming apparatus 101 sets new values to the temporal job ID and the temporal session ID only when the management server 31 is not available for user authentication. The management server 31 determines that ex post user authentication is necessary, for example, if the temporal session ID is not NUL.

In order to prevent the same temporal job IDs and same temporal session IDs from being assigned in the image forming apparatuses 101 to 10$m$, each of a temporal job ID and a temporal session ID contains an identification code of the image forming apparatus that assigns it.

Figure 18:
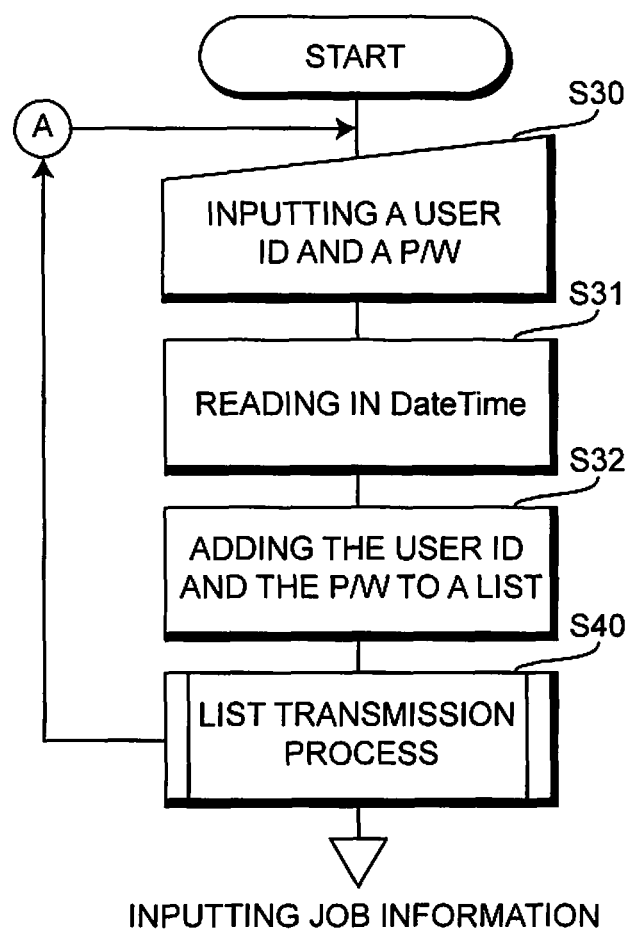
FIG. 18 shows a flowchart that indicates a login process in an image forming apparatus in Embodiment 5 of this invention.

FIG. 18 shows a flowchart that indicates a login process in the image forming apparatus 101 in Embodiment 5.

(Step S30) a user inputs a user ID and a password by operating the operation panel 15 or making the IC card 23 approach the IC card reader-writer 21.

(Step S31) the image forming apparatus 101 reads a current time and date from the timer 22.

(Step S32) the image forming apparatus 101 adds a new structure variable 320C (i.e. an instance of it) into the authentication information list in the buffer area 130 as shown in FIG. 20, and writes the user ID, the password, and the login attempting time and date into the variable.

Figure 19:
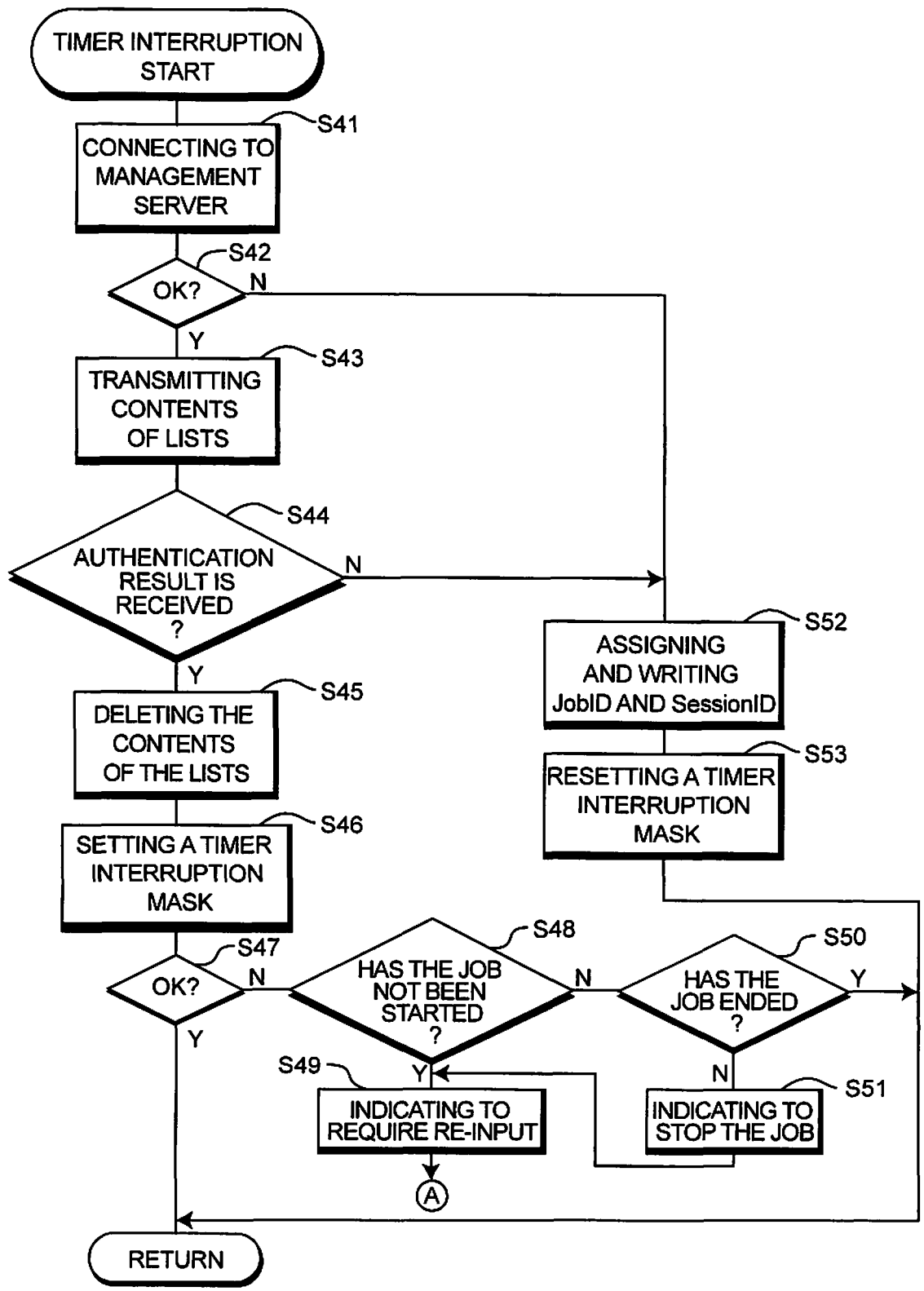
FIG. 19 shows a flowchart that indicates a timer interruption process in the case that unprocessed authentication information is stored in the image forming apparatus.

(Step S40) the image forming apparatus 101 executes the following process in Steps S41 to S53 shown in FIG. 19.

(Step S41) the image forming apparatus 101 establishes a TCP/IP connection with the management server 31.

(Step S42) if the connection is established successfully, Step S43 is executed next; otherwise, Step S52 is executed next.

(Step S43) the image forming apparatus 101 transmits contents of the authentication information list and the job log list stored in the buffer area 130 to the management server 31.

(Step S44) if authentication results are received within a predetermined time from the transmission of the lists, Step S45 is executed next. If any authentication results are not received, Step S52 is executed next. Here, it is not considered that only a part of authentication results is not received.

(Step S45) the image forming apparatus 101 deletes all the structure variables serially linked to the headnote 320HA in the buffer area 130.

(Step S46) the image forming apparatus 101 sets a timer interruption mask mentioned below to prevent a timer interruption event from occurring.

(Step S47) if all the authentication results indicate success, the authentication process shown in FIG. 18 ends. Consequently, a user can input job information such as job type and sheet size by operating the operation panel 15, and push down the start key to start a job. If any of the authentication results indicates failure, Step S48 is executed next.

(Step S48) if the start key has not been pushed down, Step S49 is executed next for a job on a user ID of unsuccessful authentication. If the job has been started, Step S50 is executed next for the job. If there is a plurality of jobs on a user ID of unsuccessful authentication, the jobs are processed as mentioned above, one by one, for example, in the descending order of the login attempting time and date LIDateTime. For simplicity, this detailed process is not depicted in FIG. 19.

(Step S49) the image forming apparatus 101 indicates a request of re-input of a user ID and a password on the operation panel 15; then it executes Step S30 in FIG. 18 next.

(Step S50) if the job on a user ID of unsuccessful authentication is being executed, Step S51 is executed next; otherwise, Step S40 in FIG. 18 ends.

(Step S51) the image forming apparatus 101 displays a message on the operation panel 15 to indicate that the job being executed is stopped due to user authentication failure; then it executes Step S49 next.

This process achieves ex post authentication immediately when the management server 31 becomes available for user authentication, and returns to an input screen of a user ID and a password even if a job is being executed in case of authentication failure. Therefore, unauthorised use can be minimized.

(Step S52) the image forming apparatus 101 assigns a temporal job ID and a temporal session ID and writes them in the structure variable 320C added in Step S32.

(Step S53) the image forming apparatus 101 resets the timer interruption mask, and enables a timer interruption event to occur.

This causes to repeatedly interrupt the MPU 11 at a time interval preset to a register in the timer 22, and this timer interruption starts the process shown in FIG. 19.

This process immediately transmits unprocessed authentication information kept in the FAX modem 19 to the management server 31.

Figure 21:
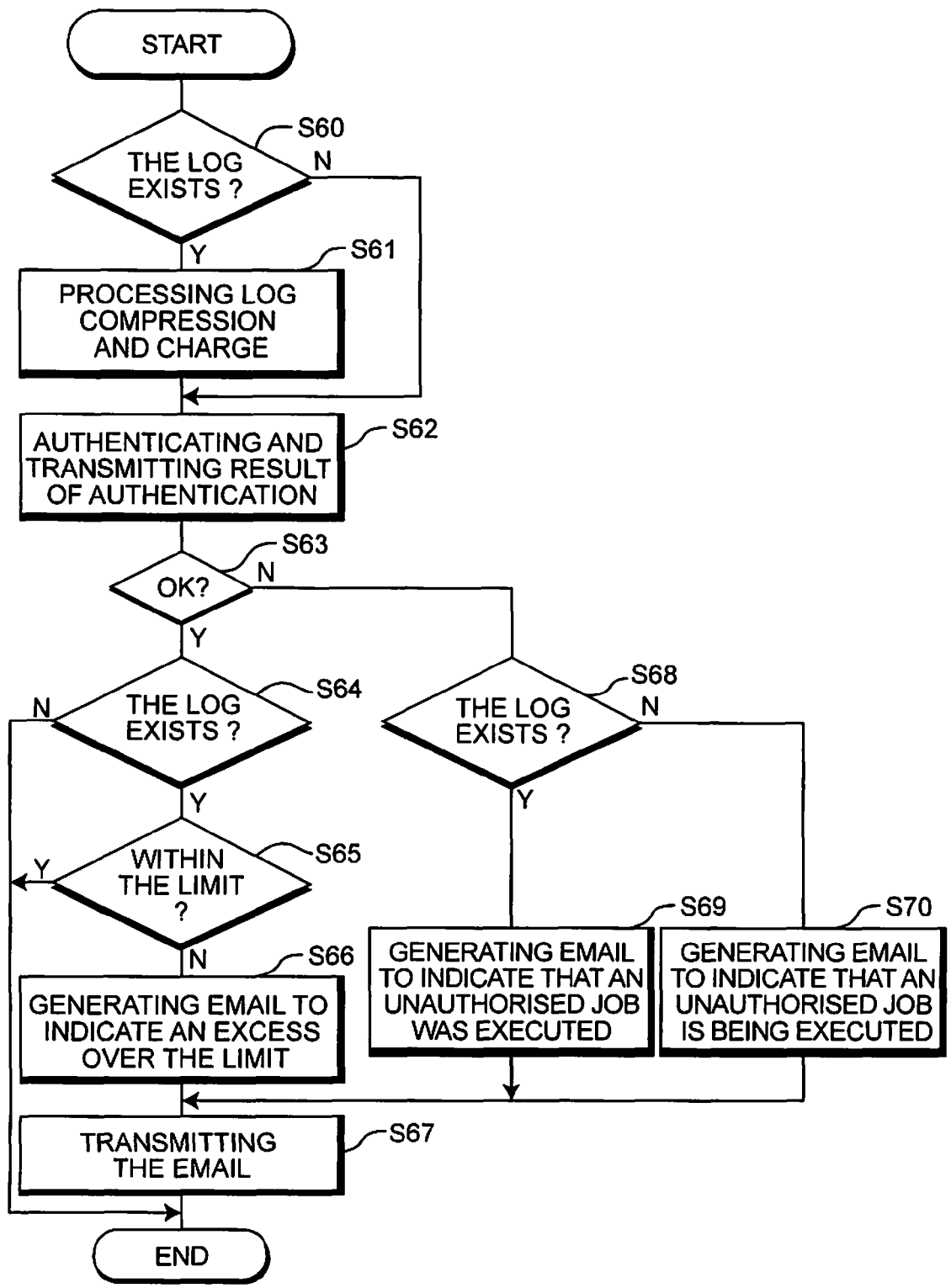
FIG. 21 shows a flowchart that indicates an ex post authentication process in a management server that receives the unprocessed authentication information transmitted in Step S43 of FIG. 19.

FIG. 21 shows a flowchart that indicates an ex post authentication process in the management server 31 that receives the unprocessed authentication information transmitted in Step S43 of FIG. 19.

(Step S60) if the management server 31 has received a job log that contains a set of a job ID and a session ID that are the same as a temporal job ID and a temporal session ID included in the authentication information, Step S61 is executed next; otherwise, Step S62 is executed next.

(Step S61) the management server 31 compresses the job log by executing a process same as the process shown in FIG. 12, and executes the aforementioned charge process based on the job log and the charge unit price information. Further, as mentioned above, the management server 31 determines whether or not the total number of pages exceeds the limit number of pages, and sets the job restriction flag if it determines that the total number of pages exceeds the limit number of pages.

(Step S62) the management server 31 ex post performs the aforementioned user authentication for the unprocessed authentication information, and transmits a result of the ex post authentication as a response to the image forming apparatus 101 that transmits the unprocessed authentication information. The image forming apparatus 101 receives it, and executes the process in Step S44 of FIG. 19.

(Step S63) if the ex post authentication results in success, Step S64 is executed next; otherwise, Step S68 is executed next. If there is a plurality of authentication results, the authentication results are processed in the same manner, one by one, for example, in the descending order of the login attempting time and date LIDateTime. For simplicity, this detailed process is not depicted in FIG. 21.

(Step S64) if there is a job log corresponding to the authentication information, Step S65 is executed next; otherwise, the ex post authentication process shown in FIG. 21 ends.

(Step S65) if the job restriction flag is 1, Step S66 is executed next; otherwise, the ex post authentication process shown in FIG. 21 ends.

(Step S66) the management server 31 generates email that contains a message, a login attempting time and date in the unprocessed authentication information, a device ID in the unprocessed authentication information, and content of the job log. A device name may be contained instead of the device ID, and the device name can be converted from the device ID with referring to a table not shown. The message indicates that the user is a registered user, but the total number of pages has exceeded the limit number of pages due to ex post authentication.

(Step S67) the management server 31 automatically transmits the email to a predetermined administrator; then the process shown in FIG. 21 ends.

(Step S68) if there is a job log corresponding to the authentication information, Step S69 is executed next; otherwise, Step S70 is executed next.

(Step S69) the management server 31 generates email that contains a message, a login attempting time and date in the unprocessed authentication information, a device ID in the unprocessed authentication information, and content of the job log. The message indicates that an unauthorised user made job execution due to post authentication. Then, Step S67 is executed next.

(Step S70) the management server 31 generates email that contains a message, a login attempting time and date in the unprocessed authentication information, and a device ID in the unprocessed authentication information. The message indicates that an unauthorised user is making job execution due to post authentication. Then, Step S67 is executed next.

In this process, the management server 31 performs processes according to the ex post authentication result, whether or not there is a job log, and whether or not the total number of pages exceeds the limit number of pages. Therefore, if the image forming apparatus 101 allows a user to use it when the management server 31 is not available for user authentication, most unauthorised use is prevented, and the management server 31 can unitarily manage user authentication, charge process, and so on.

The description of the present invention has been presented for purposes of illustration and description, and is not intended to be exhaustive or limited to the invention in the form disclosed. Many modifications and variations will be apparent to those of ordinary skill in the art. For example, some modifications can be considered as follows.

(1) The job log may be described in another format other than XML, and only one of a header (e.g. the starting tag) and a footer (e.g. the ending tag) may be used for a delimiter between two page parts in the page charge information.

(2) The image forming apparatus may transmit only a part such as header of a job log at first, and may determine whether or not an acknowledgement is received from the management server 31 in order to determine whether or not the management server 31 can receive the job log.

(3) The management server 31 may be configured as two separated servers, i.e. an authentication server that performs a user authentication process and a charge server that performs charge management. The image forming apparatus may contain the charge server. One machine may contain the print server 30 and the management server 31.

(4) The group ID may be a code for identifying a group such as project team or class, other than the section ID of a section.

(5) A result of comparison between the limit number of pages and the total number of pages may be used instead of the job restriction flag.

(6) In the aforementioned embodiments, the limit number of usage and the total number of usage are the limit number of pages and the total number of pages. Alternatively, the number of usage may be the number of sheets, the number of sheet bunches that a sheet bunch consists of a predetermined number of sheets, or the like.

What is claimed is:

1. An image forming apparatus comprising:
a processor;
a communication interface; and
a storage unit that stores a program causing the processor to write a log of a print job in the storage unit, to read out the log of a finished print job from the storage unit and transmit the log via the communication interface to a charge server connected to a network;
wherein the program causes the processor to write charge information of each page in the print job into the log when printing the page is finished, and the charge information of each page includes a page count field so that if the charge information of k pages are identical, the charge server merges the charge information of the k pages into charge information of one page, and writes the k in the page count field in the charge information of one page.

2. The image forming apparatus according to claim 1, wherein the charge information includes a page size, a sheet type, and information indicating duplex printing or not.

3. A charge server comprising:
a processor;
a communication interface; and
a storage unit that stores a program causing the processor to receive a log of a finished job via the communication interface from an image forming apparatus connected to a network and to store the log in the storage unit;
wherein the log includes charge information, the charge information of each printed page in the job includes a page count field; and the program causes the processor to merge the charge information of k pages into charge information of one page and write the k in the page count field in the charge information of one page, if the charge information of k pages are identical except for the page count field.

4. An image forming system, comprising:
plural image forming apparatuses connected to a network; and
a charge server connected to the network;
wherein each of the image forming apparatuses comprises:
a first processor;
a first communication interface; and
a first storage unit that stores a first program causing the first processor to write a log of a print job in the first storage unit, to read out the log of a finished print job from the first storage unit and transmit the log via the first communication interface to the charge server;
wherein the first program causes the first processor to write charge information of each page in the print job into the log when printing the page is finished, and the charge information of each page includes a page count field so that if the charge information of k pages are identical, the charge server merges the charge information of the k pages into charge information of one page, and writes the k in the page count field in the charge information of one page; and
the charge server comprises:
a second processor;
a second communication interface; and
a second storage unit that stores a second program causing the second processor to receive a log of a finished job via the second communication interface from any of the image forming apparatuses and to store the log in the second storage unit;
wherein the log includes charge information, the charge information of each printed page in the job includes a page count field; and the second program causes the second processor to merge the charge information of k pages into charge information of one page and write the k in the page count field in the charge information of one page, if the charge information of k pages are identical except for the page count field.

5. A charge server, comprising:
a processor;
a communication interface; and
a storage unit that stores a program causing the processor to receive a log of a finished job via the communication interface from an image forming apparatus connected to a network and to store the log in the storage unit;

wherein the log includes charge information of each printed page; and the program causes the processor to add a page count field to the charge information of each printed page, merge the charge information of k pages into charge information of one page, and write the k in the page count field of the charge information of one page, if the charge information of k pages are identical except for the page count field.

6. An image forming system, comprising:

plural image forming apparatuses connected to a network; and a charge server connected to the network;

wherein the charge server comprises:
- a first processor;
- a first communication interface; and
- a first storage unit that stores a first program causing the first processor to receive a log of a finished job via the communication interface from any of the image forming apparatuses and to store the log in the first storage unit;

wherein the log includes charge information of each printed page; and the first program causes the first processor to add a page count field to the charge information of each printed page, merge the charge information of k pages into charge information of one page, and write the k in the page count field of the charge information of one page, if the charge information of k pages are identical except for the page count field; and each of the image forming apparatuses comprises:
- a second processor;
- a second communication interface; and
- a second storage unit that stores a second program causing the second processor to write a log of a print job in the second storage unit, to read out the log of a finished print job from the second storage unit and transmit the log via the second communication interface to the charge server.

* * * * *